United States Patent
Aggarwal et al.

(10) Patent No.: US 12,079,360 B2
(45) Date of Patent: Sep. 3, 2024

(54) ENABLING LIMITED DATABASE ACCESS USING RANDOMIZED LIMITED ACCESS POINTERS

(71) Applicants: ATLASSIAN PTY LTD., Sydney (AU); Atlassian US, Inc., San Francisco, CA (US)

(72) Inventors: Nipun Aggarwal, Panchkula (IN); Vipul Gupta, Bangalore (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 141 days.

(21) Appl. No.: 17/810,046

(22) Filed: Jun. 30, 2022

(65) Prior Publication Data

US 2024/0005016 A1    Jan. 4, 2024

(51) Int. Cl.
*G06F 21/62* (2013.01)
*G06F 16/22* (2019.01)

(52) U.S. Cl.
CPC ........ *G06F 21/6218* (2013.01); *G06F 16/221* (2019.01); *G06F 16/2282* (2019.01)

(58) Field of Classification Search
CPC ............... G06F 16/221; G06F 16/2282; G06F 21/6218; G06F 21/6227
See application file for complete search history.

(56) References Cited

U.S. PATENT DOCUMENTS

| | | | | |
|---|---|---|---|---|
| 6,643,648 B1* | 11/2003 | Ross | ........... | G06F 21/6227 707/999.009 |
| 8,386,445 B2* | 2/2013 | Egan | ........... | G06F 16/2282 707/694 |
| 8,732,159 B2* | 5/2014 | Valentin | ........... | G06F 16/2471 707/714 |
| 8,732,200 B2* | 5/2014 | Tootill | ........... | G06F 21/6227 707/634 |
| 8,930,391 B2* | 1/2015 | Chakrabarti | ........... | G06F 16/951 707/765 |
| 9,002,860 B1* | 4/2015 | Ghemawat | ........... | G06F 3/064 707/755 |
| 9,031,930 B2* | 5/2015 | Valentin | ........... | G06F 16/2423 707/718 |
| 9,384,239 B2* | 7/2016 | Musuvathi | ........... | G16B 30/00 |
| 9,594,777 B1* | 3/2017 | Aerni | ........... | G06F 16/278 |
| 9,870,399 B1* | 1/2018 | Sinclair | ........... | G06F 16/24552 |
| 10,095,720 B2* | 10/2018 | Mano | ........... | G06F 16/2237 |
| 10,282,685 B2* | 5/2019 | Lassau | ........... | G06Q 10/06315 |
| 10,430,411 B2* | 10/2019 | Lakshminarayan | .. | G06F 16/196 |
| 10,496,319 B2* | 12/2019 | Andrei | ........... | G06F 3/061 |
| 10,496,621 B2* | 12/2019 | Oks | ........... | G06F 16/221 |

(Continued)

*Primary Examiner* — Gary S Gracia
(74) *Attorney, Agent, or Firm* — Alston & Bird LLP

(57) ABSTRACT

Various embodiments of the present invention provide methods, apparatuses, systems, computing devices, computing entities, and/or the like for facilitating efficient and effective execution of database management operations. For example, various embodiments of the present invention describe techniques for enabling access to anatomized data associated with a database table without using computationally expensive data anatomization techniques that use data masking and/or data manipulation and by using limited access pointers that are generated using randomized associations between database rows of a database table.

20 Claims, 13 Drawing Sheets

(56) References Cited

U.S. PATENT DOCUMENTS

| | | | |
|---|---|---|---|
| 10,909,109 B1* | 2/2021 | Kambhampati | G06F 16/2282 |
| 11,068,537 B1* | 7/2021 | Goyal | G06F 16/278 |
| 11,157,500 B2* | 10/2021 | Seong | G06F 16/278 |
| 11,288,274 B1* | 3/2022 | Alsaadi | G06F 16/278 |
| 11,334,539 B2* | 5/2022 | Mathur | G06F 16/2365 |
| 11,341,120 B2* | 5/2022 | Schulze | G06F 3/0604 |
| 11,422,805 B1* | 8/2022 | Kelly | G06F 7/766 |
| 11,461,316 B2* | 10/2022 | Rout | G06F 16/221 |
| 2012/0323845 A1* | 12/2012 | Catterall | G06F 16/20 |
| | | | 707/E17.005 |
| 2012/0323923 A1* | 12/2012 | Duan | G06F 16/24554 |
| | | | 707/741 |
| 2014/0006379 A1* | 1/2014 | Arndt | G06F 16/2255 |
| | | | 707/E17.017 |
| 2014/0149450 A1* | 5/2014 | Seufert | G06F 16/245 |
| | | | 707/769 |
| 2014/0236579 A1* | 8/2014 | Kurz | G06F 40/284 |
| | | | 704/9 |
| 2014/0244628 A1* | 8/2014 | Yoon | G06F 16/245 |
| | | | 707/722 |
| 2015/0058351 A1* | 2/2015 | Brand | G06F 16/2228 |
| | | | 707/741 |
| 2015/0058352 A1* | 2/2015 | Brand | G06F 16/2228 |
| | | | 707/741 |
| 2016/0253372 A1* | 9/2016 | Nguyen | G06F 16/245 |
| | | | 707/756 |
| 2017/0228407 A1* | 8/2017 | Mano | G06F 16/221 |
| 2017/0255675 A1* | 9/2017 | Chavan | G06F 16/24562 |
| 2018/0189331 A1* | 7/2018 | Fabijancic | G06F 16/2282 |
| 2019/0288850 A1* | 9/2019 | Beecham | G06F 21/6209 |
| 2020/0097472 A1* | 3/2020 | Vertsel | G06F 40/253 |
| 2020/0175072 A1* | 6/2020 | Harris | G06F 16/9024 |
| 2020/0265026 A1* | 8/2020 | Gruszecki | G06F 16/2282 |
| 2020/0387490 A1* | 12/2020 | Schulze | G06F 16/2228 |
| 2021/0081460 A1* | 3/2021 | Kirkham | G06F 16/90335 |
| 2021/0157812 A1* | 5/2021 | Rumiantsau | G06F 16/24522 |
| 2021/0316072 A1* | 10/2021 | Wehba | G16H 20/17 |
| 2021/0397631 A1* | 12/2021 | Rout | G06F 16/288 |
| 2022/0382749 A1* | 12/2022 | Rout | G06F 16/221 |
| 2023/0134354 A1* | 5/2023 | Rout | G06N 3/042 |
| | | | 706/12 |
| 2023/0186026 A1* | 6/2023 | Arthur | H04L 51/02 |
| | | | 704/9 |
| 2024/0005016 A1* | 1/2024 | Aggarwal | G06F 21/6227 |

* cited by examiner

500

| FirstName | LastName | FavoriteRestaurant |
|---|---|---|
| Alice | Quack | ABC |
| Bob | Chuckle | DEF |
| Tom | Moo | ABC |

FIG. 5

| FirstName | LastName | FavoriteRestaurant |
|---|---|---|
| Alice | Moo | ABC |
| Bob | Quack | DEF |
| Tom | Chuckle | ABC |

ENABLING LIMITED DATABASE ACCESS USING RANDOMIZED LIMITED ACCESS POINTERS

BACKGROUND

Various embodiments of the present invention address technical challenges related to performing efficient and effective execution of database management operations.

BRIEF SUMMARY

In general, various embodiments of the present invention provide methods, apparatuses, systems, computing devices, computing entities, and/or the like for facilitating efficient and effective execution of database management operations. For example, various embodiments of the present invention describe techniques for enabling access to anatomized data associated with a database table of an encrypted database without using computationally expensive data anatomization techniques that use data masking and/or data manipulation and by using limited access pointers that are generated using randomized associations between database rows of a database table.

In accordance with one aspect, a method includes: identifying a group of database values of a database table, wherein: (i) each database value is associated with a respective database row and a respective database column, (ii) each database row comprises a row-wise subset of the group of database values that collectively correspond to a database column schema of the database table, and (iii) the group of database values comprise a plurality of non-terminal database values that are associated with one or more non-terminal database columns and a plurality of terminal database values that are associated with a terminal database column; for each non-terminal database value, generating a limited access pointer to a respective subsequent database value whose respective database row is different from the respective database row of the non-terminal database value and whose respective database column is different from the respective database column of the non-terminal database value; and in response to a limited access request from a requesting computing device, providing shuffled database output data to the requesting computing device, wherein: (i) the shuffled database output data comprises a plurality of shuffled database rows each comprising a shuffled row-wise subset of the group of database values that collectively correspond to the database column schema, and (ii) the plurality of shuffled database rows are determined based on each limited access pointer.

In accordance with another aspect, an apparatus comprising at least one processor and at least one memory including program code, the at least one memory and the program code configured to, with the processor, cause the apparatus to at least: identify a group of database values of a database table, wherein: (i) each database value is associated with a respective database row and a respective database column, (ii) each database row comprises a row-wise subset of the group of database values that collectively correspond to a database column schema of the database table, and (iii) the group of database values comprise a plurality of non-terminal database values that are associated with one or more non-terminal database columns and a plurality of terminal database values that are associated with a terminal database column; for each non-terminal database value, generate a limited access pointer to a respective subsequent database value whose respective database row is different from the respective database row of the non-terminal database value and whose respective database column is different from the respective database column of the non-terminal database value; and in response to a limited access request from a requesting computing device, provide shuffled database output data to the requesting computing device, wherein: (i) the shuffled database output data comprises a plurality of shuffled database rows each comprising a shuffled row-wise subset of the group of database values that collectively correspond to the database column schema, and (ii) the plurality of shuffled database rows are determined based on each limited access pointer.

In accordance with yet another aspect, a computer program product comprising at least one non-transitory computer-readable storage medium having computer-readable program code portions stored therein, the computer-readable program code portions configured to: identify a group of database values of a database table, wherein: (i) each database value is associated with a respective database row and a respective database column, (ii) each database row comprises a row-wise subset of the group of database values that collectively correspond to a database column schema of the database table, and (iii) the group of database values comprise a plurality of non-terminal database values that are associated with one or more non-terminal database columns and a plurality of terminal database values that are associated with a terminal database column; for each non-terminal database value, generate a limited access pointer to a respective subsequent database value whose respective database row is different from the respective database row of the non-terminal database value and whose respective database column is different from the respective database column of the non-terminal database value; and in response to a limited access request from a requesting computing device, provide shuffled database output data to the requesting computing device, wherein: (i) the shuffled database output data comprises a plurality of shuffled database rows each comprising a shuffled row-wise subset of the group of database values that collectively correspond to the database column schema, and (ii) the plurality of shuffled database rows are determined based on each limited access pointer.

BRIEF DESCRIPTION OF THE DRAWINGS

Figure 1:
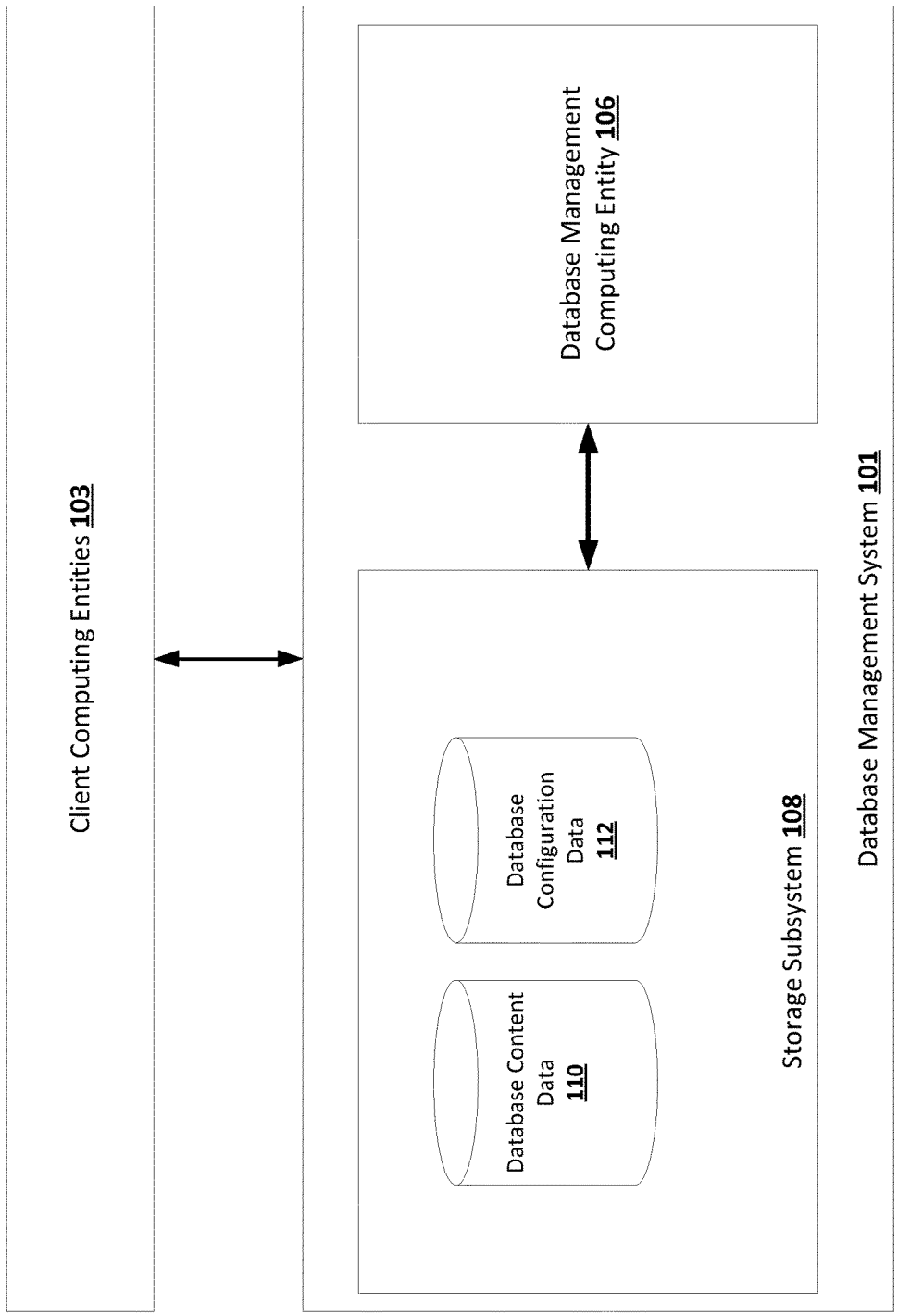

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
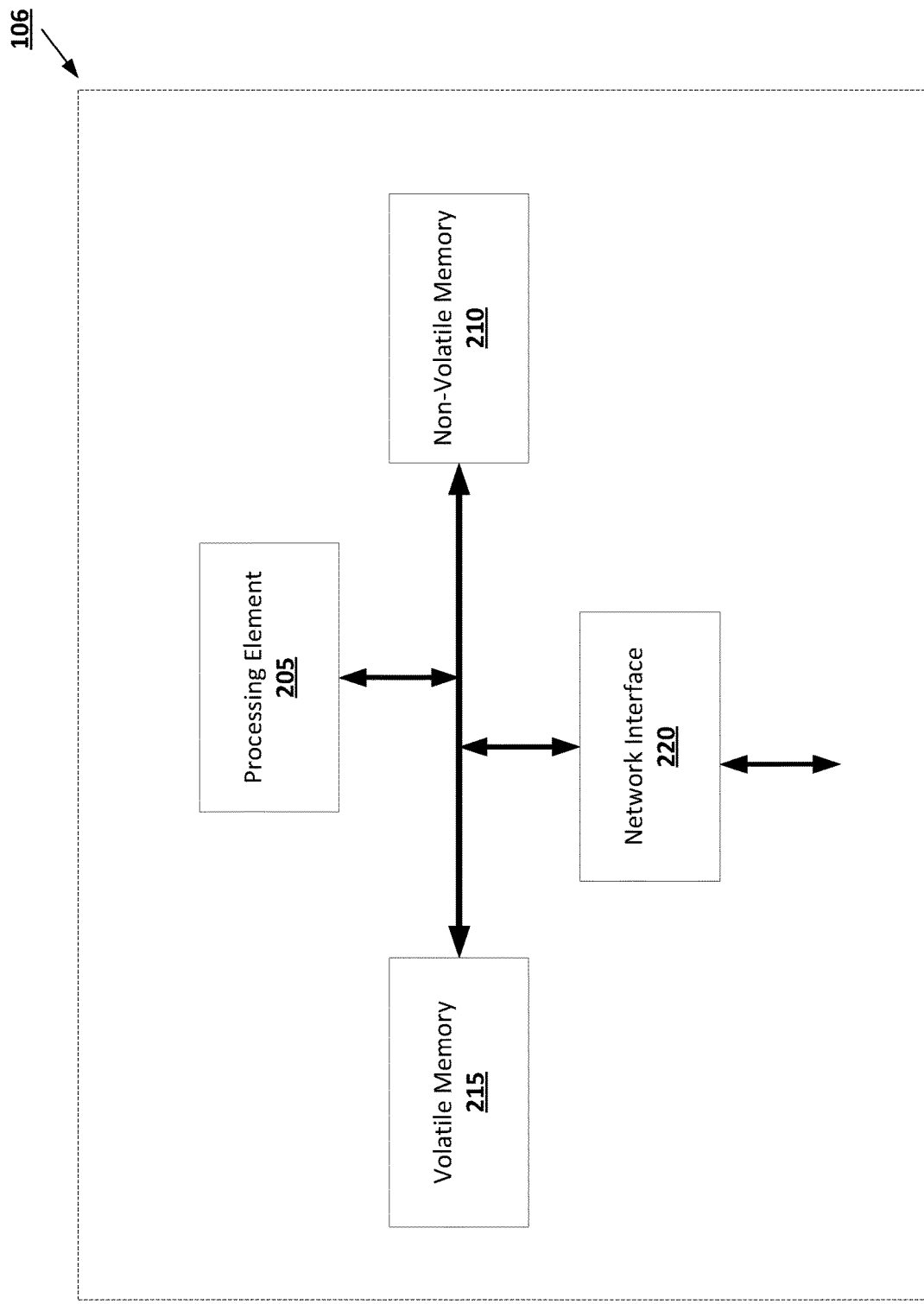

FIG. 2 provides an example database management computing device in accordance with some embodiments discussed herein.

Figure 3:
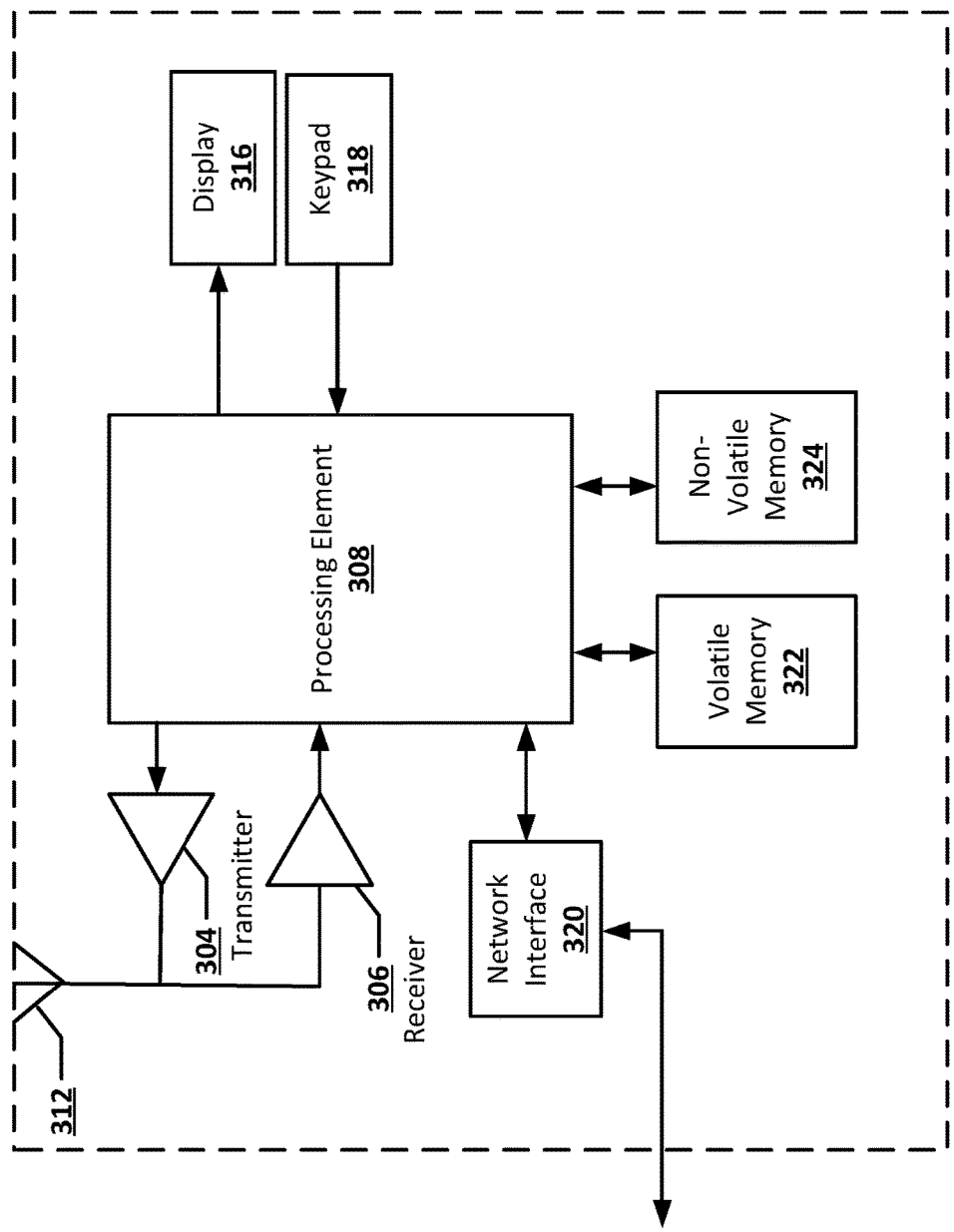

FIG. 3 provides an example client computing device in accordance with some embodiments discussed herein.

Figure 4:
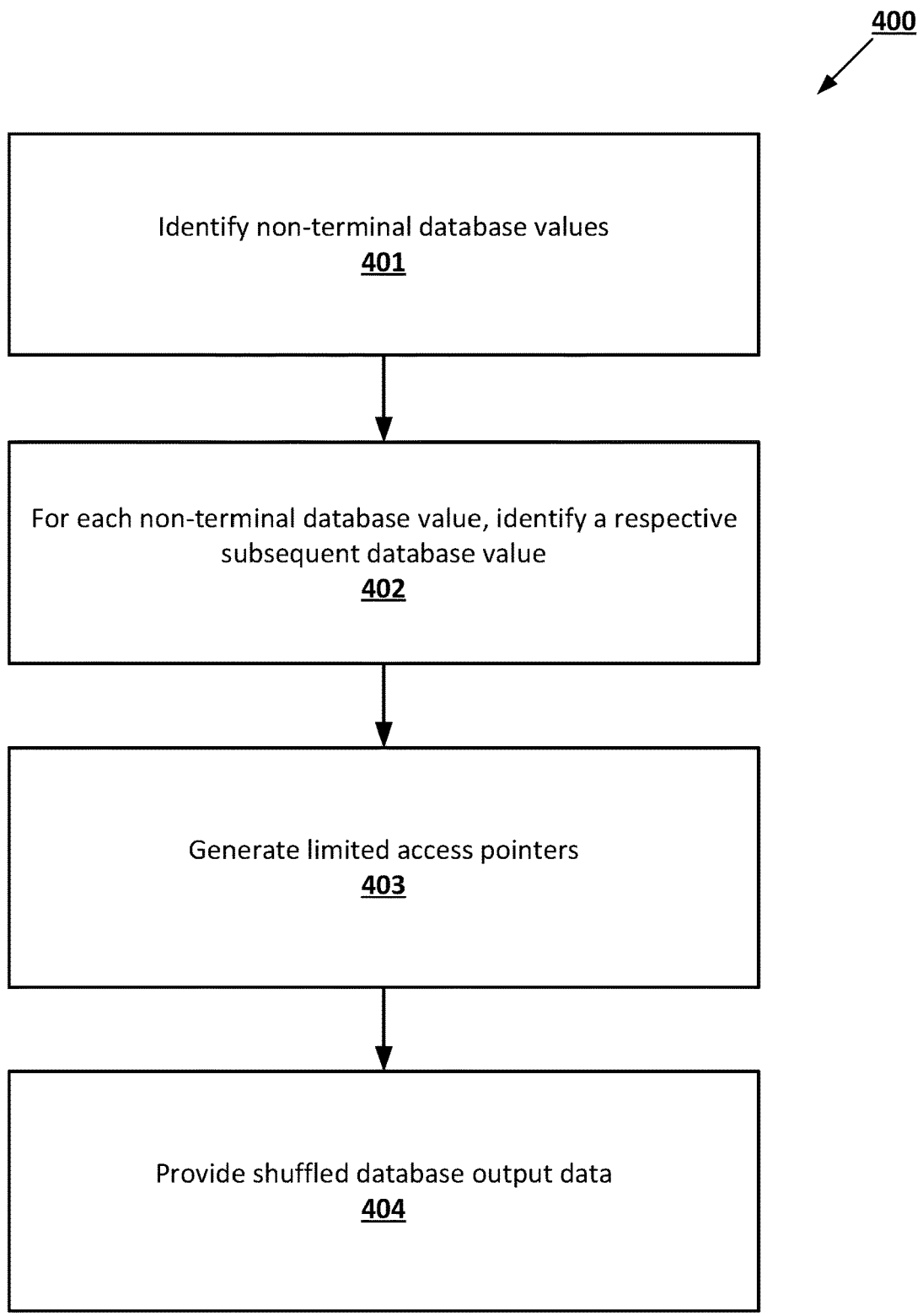

FIG. 4 is a flowchart diagram of an example process for enabling access to a database table of a database using a limited access mode in accordance with some embodiments discussed herein.

FIG. 5 provides an operational example of a database table in accordance with some embodiments discussed herein.

Figure 6:
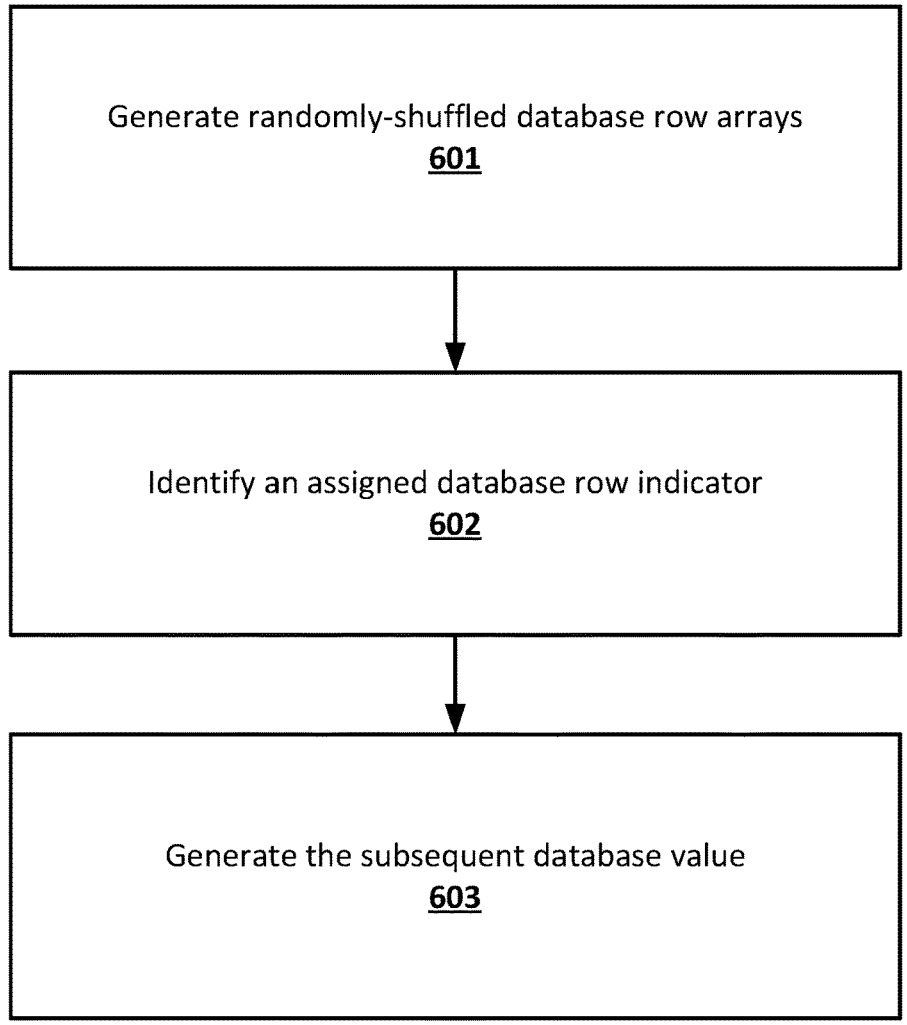

FIG. 6 is a flowchart diagram of an example process for generating a subsequent database value for a non-terminal database value in accordance with some embodiments discussed herein.

Figure 7:
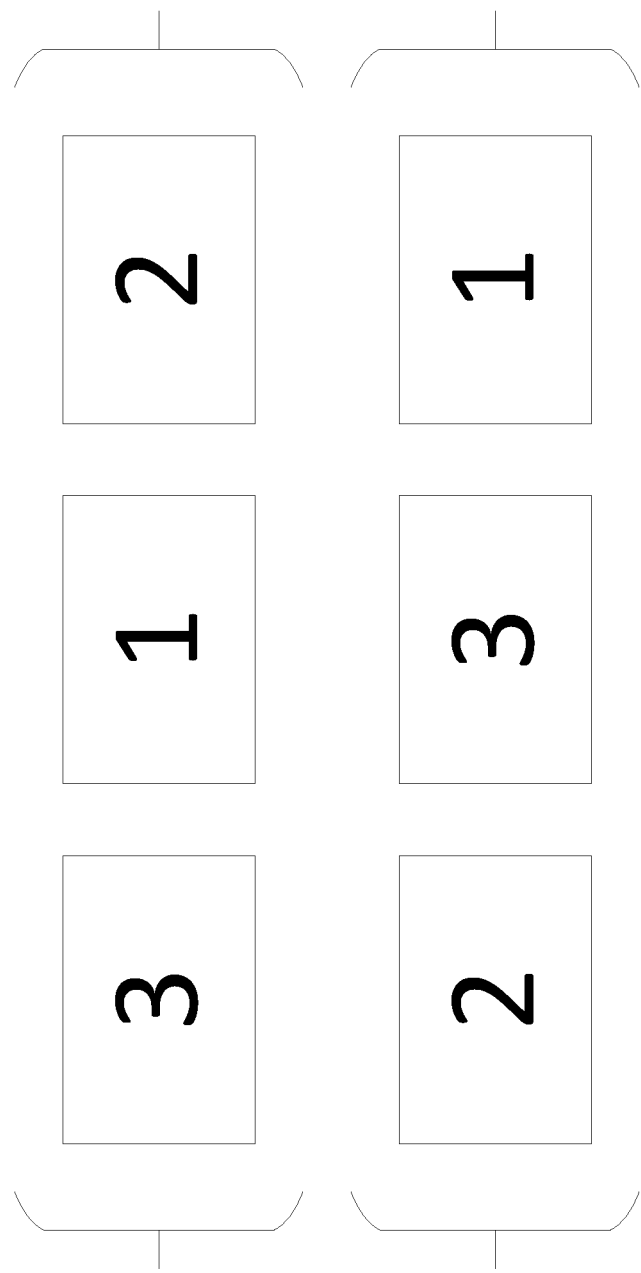

FIG. 7 provides an operational example of shuffled database row arrays for a database table in accordance with some embodiments discussed herein.

Figure 8:
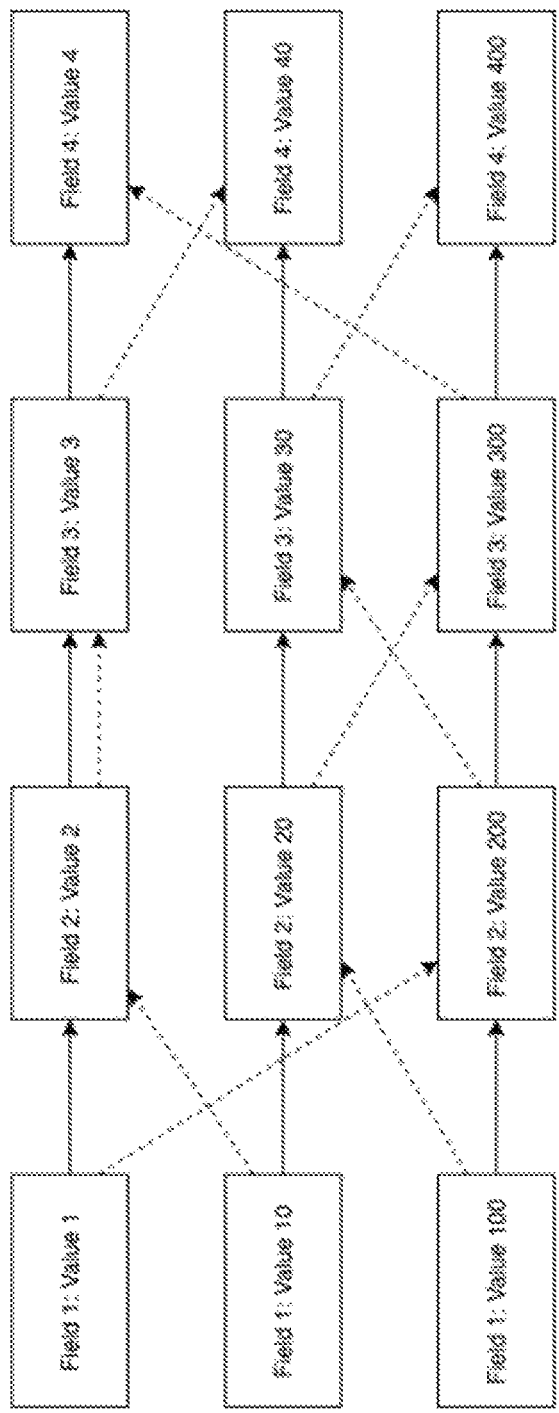

FIG. 8 provides an operational example of the logical diagram of a database table with full access pointers and limited access pointers in accordance with some embodiments discussed herein.

Figure 9:
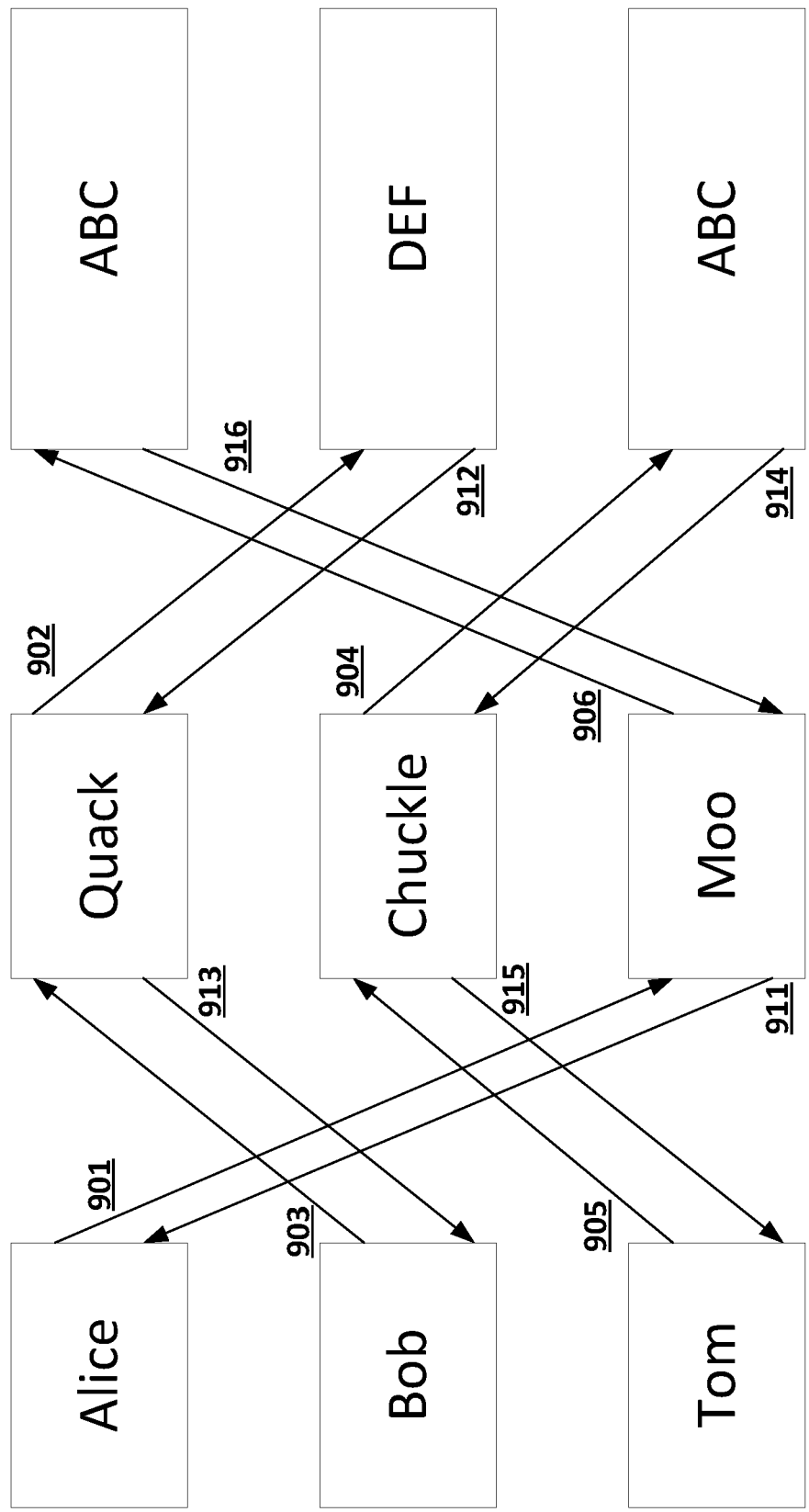

FIG. 9 provides an operational example of limited access pointers associated with a database table in accordance with some embodiments discussed herein.

FIG. 10 provides an operational example of an anonymized data table that is generated using limited access pointers in accordance with some embodiments discussed herein.

Figure 11:
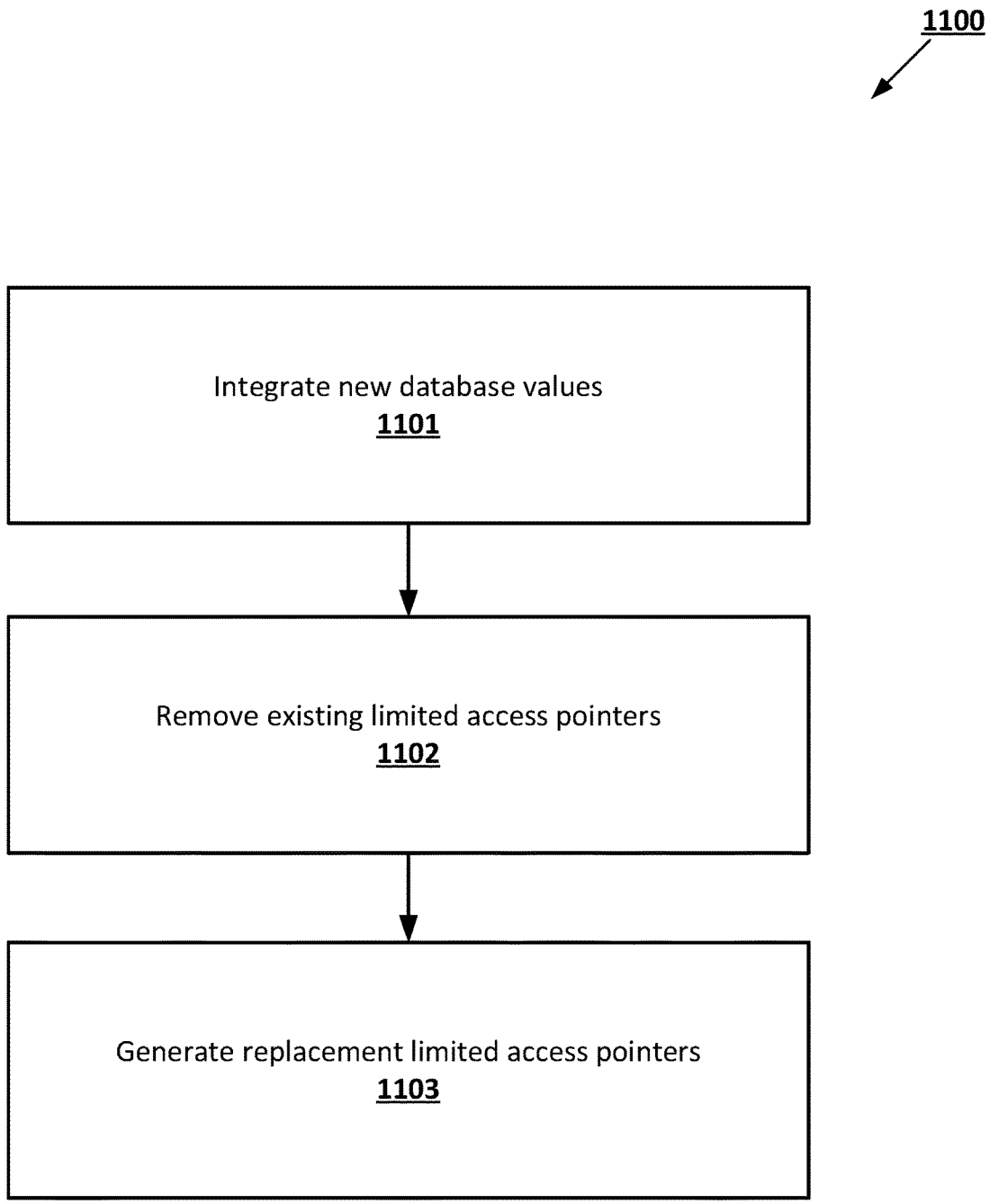

FIG. 11 is a data flow diagram of an example process for updating limited access pointers of a database table in response to a row insertion request to insert a new database row to the plurality of database rows of the database table in accordance with some embodiments discussed herein.

Figure 12:
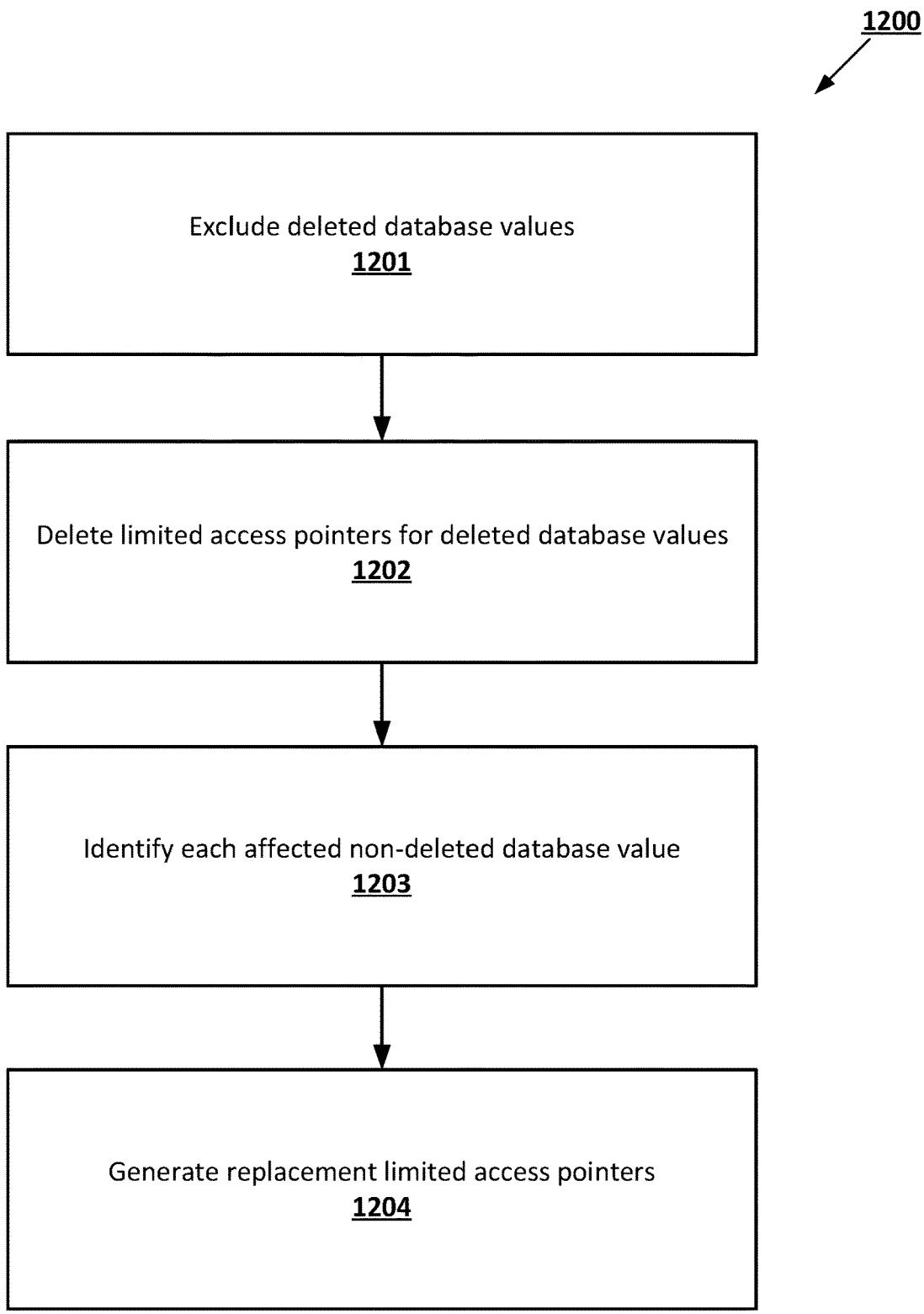

FIG. 12 is a data flow diagram of an example process for updating limited access pointers of a database table in response to a row deletion request to delete a deleted database row from the database rows of a database table in accordance with some embodiments discussed herein.

Figure 13:
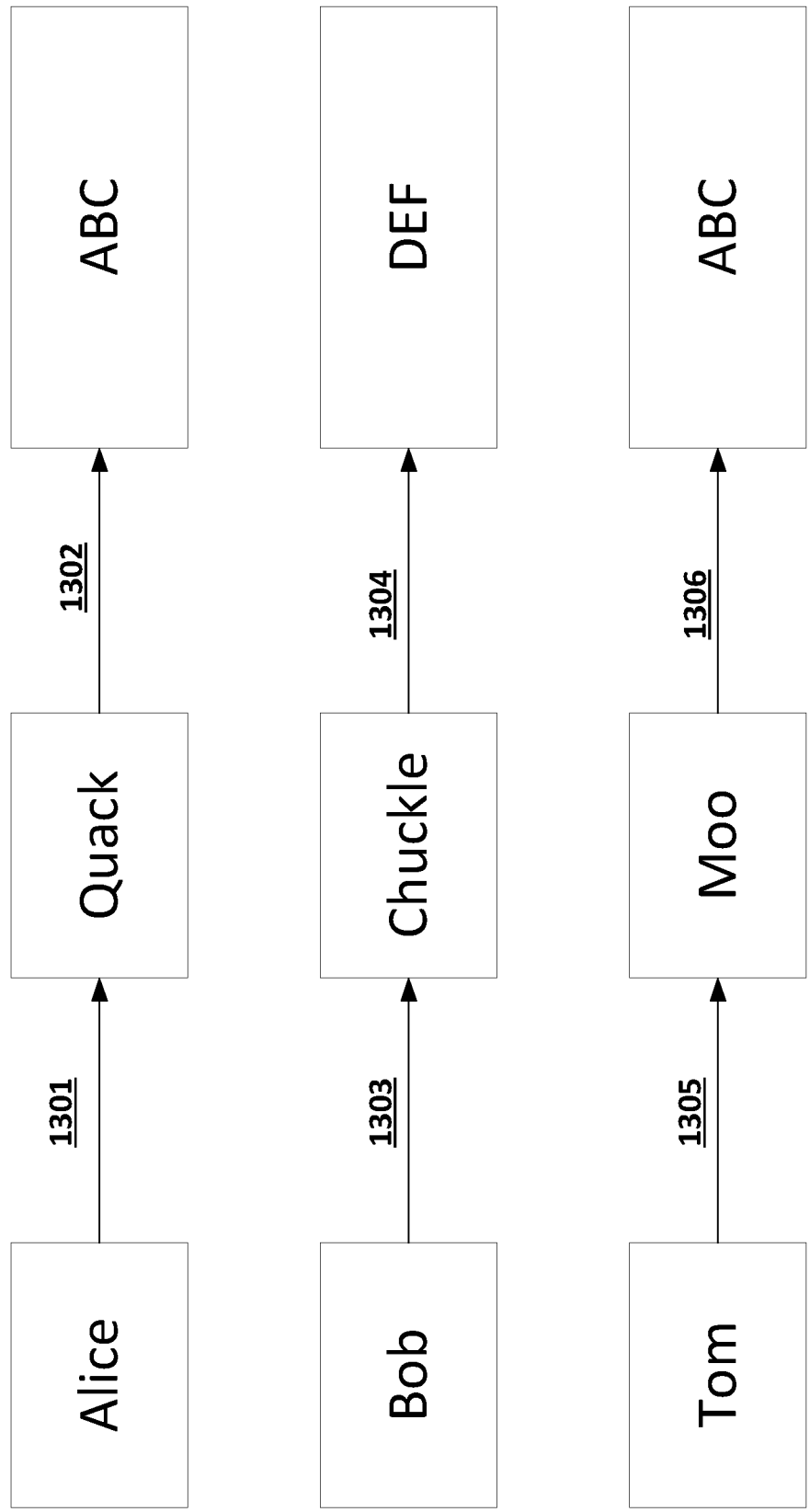

FIG. 13 provides an operational example of full access pointers associated with a database table in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

Overview

Various embodiments of the present invention improve computational efficiency of database management operations that control access to secure database systems by introducing techniques that enable providing limited access to database content data using limited access pointers. The limited access mode enabled by various embodiments of the present invention can be established by using limited access pointers that point across database values without revealing row-wise associations of those database values. These limited access pointers are more efficient than data anonymization techniques that use manipulation and/or masking of underlying database value data in at least two ways: (i) pointers can be stored using fewer computer storage resources (e.g., in some embodiments, a pointer can occupy as low as two bytes), as opposed to data manipulation/masking techniques that typically require duplicating existing database tables, and (ii) operations needed to generate limited access pointers are more computationally efficient than operations needed to mask/manipulate data. Indeed, as described in the present document, generating limited access pointers can be performed using array shuffling techniques that can be performed with linear computational complexity. Accordingly, by disclosing techniques that enable providing limited access to database content data using limited access pointers, various embodiments of the present invention improve computational efficiency of database management operations that control access to secure database systems.

Various embodiments of the present invention relate to enabling two modes of access to an encrypted database: a full database access and a limited database access. The full database access is created using full access pointers between a sequence of key/value pairs that belong to a common database row, while the limited database access is created using limited access pointers between a sequence of key/value pairs that belong to different database rows. In some embodiments, a user having full access privileges can access decrypted data associated with the database using the full access pointers and thus obtain precise data describing row-wise associations of key-value pairs associated with the database, while a user having limited access privileges can access decrypted data associated with the database using limited access pointers and thus obtain data describing distribution of key-value pairs across the rows of the database without obtaining data describing row-wise associations of key-value pairs associated with the database.

In some embodiments, using these full access pointers and in a full access mode, a requesting computing device can obtain data about precise data values associated with each of the rows. This may be useful, for example, for a machine learning system that is configured to generate a person-specific prediction for a target person. However, this full access mode reveals substantial row-specific data that may be deemed confidential. In some traditional systems, to accommodate this, a separate "anonymized" database is created, an approach incurs substantial storage costs as well as processing costs associated with anonymizing some data fields described by the underlying database. In contrast, in accordance with various embodiments of the present invention, limited access pointers are used to traverse the database without revealing row-wise associations. While the retrieved data cannot describe row-wise associations of data, the retrieved data can describe distributions of data values which may be significant to various machine learning and/or statistical inference applications.

In some embodiments, given a database table that has N rows, the techniques described herein enable generating R*N shuffled database rows, where R may be a developer-specified value that describes a number of different arrangements for generating limited access pointers between the database table values. For example, in some embodiments, given R=2, two sets of limited access pointers may be generated between database values, and thus 2*N shuffled database rows may be generated. This approach may be highly beneficial for augmenting training data used to train machine learning models. By generating training data based on shuffled database rows in addition to or instead of initial/non-shuffled database rows, various embodiments of the present invention enable generating increased training data used to train machine learning models, which in turn leads to more accurate machine learning models and/or machine learning models that are more robust to variations in sequential structures of training input fields.

Definitions

The term "database row" refers to a data construct that is maintained by a database management computing device as part of the database configuration data for a database table. A database row describes a subset of database values for the database table as described by database content data for the database, where the database values all relate to a common database entity (e.g., a common real-world and/or virtual entity). In some embodiments, the subset of database values that are described by a particular database row are referred to herein as the "row-wise database value subset" for the particular database row. For example, if a database row describes that the first name of a corresponding database entity is "John", the last name of the corresponding database entity is "Smith", and the birthdate of the corresponding database entity is Jan. 1, 1980, then the row-wise database value subset for the noted database row may be the set {"John", "Smith", Jan. 1, 1989}.

The term "database column" refers to a data construct that is maintained by a database management computing device as part of the database configuration data for a database table. A database column describes a subset of database values for the database table as described by the database content for the database, where the database values all relate to a common database field (e.g., a common attribute). For example, if a database table comprises: (i) a first database row that describes that the first name of a corresponding database entity is "John", the last name of the corresponding database entity is "Smith", and the birthdate of the corresponding database entity is Jan. 1, 1980, and (ii) a second row that describes that the first name of a corresponding database entity is "Elizabeth", the last name of the corresponding database entity is "Reed", and the birthdate of the corresponding database entity is Jan. 31, 1990, then the database table may be associated with three database columns: a first database column that is associated with the database value subset {"John", "Elizabeth"} and a first name database field, a second database column that is associated with the database value subset {"Smith", "Reed"} and a last name database field, and a third database column that is associated with the database value subset {Jan. 1, 1980, Jan. 31, 1990} and a birthdate database field. In some embodiments, the set of database fields that correspond to database fields of a database table are referred to herein as the database column schema of the database table. For example, when a database table is associated with a first database column that is associated with the database value subset {"John", "Elizabeth"} and a first name database field, a second database column that is associated with the database value subset {"Smith", "Reed"} and a last name database field, and a third database column that is associated with the database value subset {Jan. 1, 1980, Jan. 31, 1990} and a birthdate database field, then database column schema for the noted database may describe the first name database field, the last name database field, and the birthdate database field.

The term "database column order" refers to a data construct that is maintained by a database management computing device as part of the database configuration data for a database table. The database column table describes an ordering of database columns associated with the database table. In some embodiments, the first database column according to the database order is referred to as the initial database column, the last database column according to the database order is referred to as the terminal database column, all of the database columns except the first database column according to the database order are referred to as the non-initial database columns, and all of the database columns except the last database column according to the database order are referred to as the non-terminal database columns. For example, when a database table is associated with a first database column that is associated with the database value subset {"John", "Elizabeth"} and a first name database field, a second database column that is associated with the database value subset {"Smith", "Reed"} and a last name database field, and a third database column that is associated with the database value subset {Jan. 1, 1980, Jan. 31, 1990} and a birthdate database field, if the first database column comes before the second database column and the second database column comes before the third database column according to the database column order, then: (i) the initial database column is the first database column, (ii) the terminal database column is the third database column, (iii) the non-initial database columns are the second database column and the third database column, and (iv) the non-initial database columns are the first database column and the second database column. In some embodiments, a database value that is associated with a non-terminal database column is referred to as a non-terminal database value.

The term "limited access pointer" refers to a data construct that is generated by a database management computing device and maintained by the database management computing device as part of the database configuration data for a database table. A limited access pointer is a pointer between a non-terminal database value and a subsequent database value for the non-terminal database value, where the subsequent database value for a particular non-terminal database value is a database value from the set of database values of the same database table as the database table of the particular non-terminal database value whose respective database row is different from the respective database row of the particular non-terminal database value and whose respective database column of the respective column. In some embodiments, given a non-terminal database value that is associated with a particular database row and a jth database column as defined in accordance with the database column order of a corresponding database table, the subsequent database value for the noted non-terminal database value is a database value of the corresponding database table that is associated with a randomly-selected database row and a (j+1)th database column as defined in accordance with the database column order of the corresponding database table. For example, if a database table comprises: (i) a first database row that describes that the first name of a corresponding database entity is "John", the last name of the corresponding database entity is "Smith", and the birthdate of the corresponding database entity is Jan. 1, 1980, and (ii) a second row that describes that the first name of a corresponding database entity is "Elizabeth", the last name of the corresponding database entity is "Reed", and the birthdate of the corresponding database entity is Jan. 31, 1990, then the limited access pointers for the noted database table may include: (i) a limited access pointer from "John" to "Reed", "(ii) a limited access pointer from "Smith" to Jan. 31, 1990, (iii) a limited access pointer from "Elizabeth" to "Smith", and (iv) a limited access pointer from "Reed" to Jan. 1, 1980. In some embodiments, each non-terminal database value is associated with at least two limited access pointers: (i) a forward limited access pointer from the non-terminal database value to the subsequent database value for the non-terminal database value, and (ii) a backward limited access pointer from the subsequent database value for the non-terminal database value to the non-terminal database value.

The term "non-shuffled database row" refers to a data construct that is generated by a database management computing device and provided to a requesting computing device (e.g., a client computing device) in response to a full access request by the requesting computing device for accessing database values of a particular database table in a full access mode. A non-shuffled database row comprises a subset of the database values of the particular database table that are generated in accordance with full access pointers. A non-shuffled database row describes the row-wise database value subset that is associated with a particular database row. In some embodiments, in response to a full access request from the requesting computing device, a database management computing entity is configured to provide non-shuffled database output data to the requesting computing device, wherein the non-shuffled database output data describes, for each database row, the row-wise database value subset that is associated with the database row.

The term "shuffled database row" refers to a data construct that is generated by a database management computing device and provided to a requesting computing device (e.g., a client computing device) in response to a limited access request by the requesting computing device for accessing database values of a particular database table in a limited access mode. A shuffled database row comprises a subset of the database values of the particular database table that are generated in accordance with limited access pointers. For example, if the limited access pointers for a database table include: (i) a limited access pointer from "John" to "Reed", "(ii) a limited access pointer from "Smith" to Jan. 31, 1990, (iii) a limited access pointer from "Elizabeth" to "Smith", and (iv) a limited access pointer from "Reed" to Jan. 1, 1980, then the shuffled database rows of the noted database table may include: (i) a first shuffled database row that is generated based on the first limited access pointer and the fourth limited access pointer and thus comprises the database value subset {"John", "Reed", Jan. 1, 1980}, and (ii) a second shuffled database row that is generated based on the second limited access pointer and the third limited access pointer and thus comprises the database value subset {"Elizabeth", "Smith", Jan. 31, 1990}. Accordingly, as illustrated by this example, in some embodiments, generating a particular shuffled database row comprises: (i) selecting a particular initial database value of the one or more initial database values (e.g., for the first shuffled database row, selecting the initial database value "John"), (ii) recording a plurality of traversed database values that are associated with a recursive traversal of limited access pointers starting from the particular initial database value to a destination terminal database value (e.g., for the first shuffled database row, recording the database value "Reed" that is visited upon traversal of the first limited access pointer originating from "John" and the destination terminal database value Jan. 1, 1980 that is visited upon traversal of the fourth limited access pointer originating from "Reed"), and (iii) generating the particular shuffled database row to comprise the plurality of traversed database values.

The term "randomly-shuffled database row array" refers to a data construct that is generated by a database management computing device as part of generating limited access pointers for a database table. A randomly-shuffled database row array is an array comprising a database row indicator for each database row of the database table, where placement of the database row indicators in the randomly-shuffled database row array is generated by randomly shuffling the database row indicators for the database rows. For example, given a database table that is associated with M=4 database rows including a database row with the database row indicator A, a database row with the database row indicator B, a database row with the database indicator C, and a database row with the database row indicator D, examples of randomly-shuffled database row arrays include a randomly-shuffled database row array {A, B, C, D}, a randomly-shuffled database row array {D, C, B, A}, a randomly-shuffled database row array {B, A, D, C}, a randomly-shuffled database row array {D, C, A, B}, and/or the like. In some embodiments, given a database table that is associated with N database columns and thus N−1 non-terminal database columns, N−1 randomly-shuffled database row arrays are generated, with each randomly-shuffled database row array being associated with a respective non-terminal database column of the N−1 non-terminal database columns. In some embodiments, given a particular non-terminal database value that belongs to an ith database row (as determined in accordance with a database row order) and a jth non-terminal database column (as determined in accordance with a database column order), to determine the subsequent database value for the particular non-terminal database value as part of generating the limited access pointer for the particular non-terminal database value: (i) the ith value of the randomly-shuffled database row array that is associated with the jth non-terminal database column is retrieved, and (ii) the subsequent database value for the particular non-terminal database value is identified as the database value whose database row is associated with the retrieved database row indicator of (i) and whose database column is the (j+1)th database column as determined in accordance with the database column order. For example, if a database table is associated with M=4 database rows and N=5 database columns, and if the first non-terminal database column is associated with a randomly-shuffled database row array {A, B, C, D}, the second non-terminal database column is associated with a randomly-shuffled database row array {D, C, B, A}, the third non-terminal database column is associated with a randomly-shuffled database row array {B, A, D, C}, and the fourth non-terminal database column is associated with a randomly-shuffled database row array {D, C, A, B}, then the subsequent database value for the database value that is associated with the second database row and the third non-terminal database column can be determined by: (i) retrieving the randomly-shuffled database row array {B, A, D, C} that is associated with the third non-terminal database column, (ii) retrieving the second value of the retrieved database row array, which is A, and (iii) identifying the database value that is associated with the fourth database column and the database row A as the subsequent database value for the database value that is associated with the second database row and the third non-terminal database column.

The term "full access pointer" refers to a data construct that is generated by a database management computing device and maintained by the database management computing device as part of the database configuration data for a database table. A full access pointer is a pointer between a non-terminal database value and a subsequent database value for the non-terminal database value, where the subsequent database value for a particular non-terminal database value is a database value from the set of database values of the same database table as the database table of the particular non-terminal database value whose respective database row is the same as the respective database row of the particular non-terminal database value and whose respective database column of the respective column. In some embodiments, given a non-terminal database value that is associated with a particular database row and a jth database column as defined in accordance with the database column order of a corresponding database table, the subsequent database value for the noted non-terminal database value is a database value of the corresponding database table that is associated with the ith database row and a (j+1)th database column as defined in accordance with the database column order of the corresponding database table. For example, if a database table comprises: (i) a first database row that describes that the first name of a corresponding database entity is "John", the last name of the corresponding database entity is "Smith", and the birthdate of the corresponding database entity is Jan. 1, 1980, and (ii) a second row that describes that the first name of a corresponding database entity is "Elizabeth", the last name of the corresponding database entity is "Reed", and the birthdate of the corresponding database entity is Jan. 31, 1990, then the limited access pointers for the noted database table may include: (i) a full access pointer from "John" to "Smith", "(ii) a full access pointer from "Smith" to Jan. 1, 1980, (iii) a full access pointer from "Elizabeth" to "Reed", and (iv) a full access pointer from "Reed" to Jan. 31, 1980. In some embodiments, each non-terminal database value is associated with at least two limited access pointers: (i) a forward full access pointer from the non-terminal database value to the subsequent database value for the non-terminal database value, and (ii) a backward full access pointer from the subsequent database value for the non-terminal database value to the non-terminal database value.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DEVIM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing device, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Framework

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

The system architecture 100 includes a database management system 101 and one or more client computing devices 102. The database management system 101 may be configured to receive database management requests (e.g., database retrieval/read requests, database modification/write requests, database configuration management requests, and/or the like) from the client computing devices 102, perform database management operations (e.g., database retrieval operations, database modification operations, database configuration management operations, and/or the like) in response to the database management requests, and optionally transmit any result data generated by the database management operations to the client computing devices 102. To perform the database management operations, the database management system 101 may maintain and update metadata associated with a database content data 110, by for example consolidating and/or aggregating the database records of the database content data 110 via communicating with the client computing devices 102 and using the database update management techniques described herein.

While various embodiments of the present invention describe a database management system 101 that has a single database management computing device (e.g., the database management computing device 106 of FIG. 1), a person of ordinary skill in the relevant technology will recognize that the database management system 101 may comprise any number of database management computing devices 106.

The database management system 101 may comprise a database management computing device 106 and a storage subsystem 108. The database management computing device 106 may be configured to receive database management requests (e.g., database retrieval requests, database modification requests, database configuration management requests, and/or the like) from the client computing devices 102, perform database management operations (e.g., database retrieval operations, database modification operations, database configuration management operations, and/or the like) in response to the database management requests, and optionally transmit any result data generated by the database management operations to the client computing devices 102. To perform the database management operations, the database management computing device 106 may maintain and update metadata associated with a database content data 110, by for example consolidating and/or aggregating the database records of the database content data 110 via communicating with the client computing devices 102 and using the database update management techniques described herein.

The storage subsystem 108 may store a database content data 110 and database configuration data 112 used by the database management computing device 106 to perform various database management operations with respect to the database content data 110. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. Examples of database configuration data 112 include database state data describing one or more database aggregates of the database content data 110.

A. Exemplary Database Management Computing Device

FIG. 2 provides a schematic of a database management computing device 106 according to one embodiment of the present invention. In general, the terms computing device, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the database management computing device 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the database management computing device 106 may include or be in communication with a processing element 205 (also referred to as processors, processing circuitry, and/or similar terms used herein interchangeably) that communicate with other elements within the database management computing device 106 via a bus, for example. As will be understood, the processing element 205 may be embodied in a number of different ways. For example, in some embodiments, the processing element 205 may be part of one or more processing elements, such as one or more processing elements that may perform operations in a parallel manner.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the database management computing device 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the database management computing device 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store, at least, portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the database management computing device 106 with the assistance of the processing element 205 and operating system.

As indicated, in one embodiment, the database management computing device 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the database management computing device 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the database management computing device 106 may include or be in communication with one or more input elements, such as a keyboard input, a mouse input, a touch screen/display input, motion input, movement input, audio input, pointing device input, joystick input, keypad input, and/or the like. The database management computing device 106 may also include or be in communication with one or more output elements (not shown), such as audio output, video output, screen/display output, motion output, movement output, and/or the like.

B. Exemplary Client Computing Device

FIG. 3 provides an illustrative schematic representative of a client computing device 102 that can be used in conjunction with embodiments of the present invention. In general, the terms device, system, computing device, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing devices 102 can be operated by various parties. As shown in FIG. 3, the client computing device 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing device 102 may be capable of operating with one or more air interface standards, communication protocols, modulation types, and access types. More particularly, the client computing device 102 may operate in accordance with any of a number of wireless communication standards and protocols, such as those described above with regard to the database management computing device 106. In a particular embodiment, the client computing device 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing device 102 may operate in accordance with multiple wired communication standards and protocols, such as those described above with regard to the database management computing device 106 via a network interface 320.

Via these communication standards and protocols, the client computing device 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing device 102 can also download changes, add-ons, and updates, for instance, to its firmware, software (e.g., including executable instructions, applications, program modules), and operating system.

According to one embodiment, the client computing device 102 may include location determining aspects, devices, modules, functionalities, and/or similar words used herein interchangeably. For example, the client computing device 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing device's 102 position in connection with a variety of other systems, including cellular towers, Wi-Fi access points, and/or the like. Similarly, the client computing device 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing device 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing device 102 to interact with and/or cause display of information/data from the database management computing device 106, as described herein. The user input interface can comprise any of a number of devices or interfaces allowing the client computing device 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing device 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing device 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing device 102. As indicated, this may include a user application that is resident on the entity or accessible through a browser or other user interface for communicating with the database management computing device 106 and/or various other computing entities.

In another embodiment, the client computing device 102 may include one or more components or functionality that are the same or similar to those of the database management computing device 106, as described in greater detail above. As will be recognized, these frameworks and descriptions are provided for exemplary purposes only and are not limiting to the various embodiments.

In various embodiments, the client computing device 102 may be embodied as an artificial intelligence (AI) computing device, such as an Amazon Echo, Amazon Echo Dot, Amazon Show, Google Home, and/or the like. Accordingly, the client computing device 102 may be configured to provide and/or receive information/data from a user via an input/output mechanism, such as a display, a camera, a speaker, a voice-activated input, and/or the like. In certain embodiments, an AI computing device may comprise one or more predefined and executable program algorithms stored within an onboard memory storage module, and/or accessible over a network. In various embodiments, the AI computing device may be configured to retrieve and/or execute one or more of the predefined program algorithms upon the occurrence of a predefined trigger event.

Exemplary System Operations

As described below, various embodiments of the present invention improve computational efficiency of database management operations that control access to secure database systems by introducing techniques that enable providing limited access to database content data using limited access pointers. The limited access mode enabled by various embodiments of the present invention can be established by using limited access pointers that point across database values without revealing row-wise associations of those database values. These limited access pointers are more efficient than data anonymization techniques that use manipulation and/or masking of underlying database value data in at least two ways: (i) pointers can be stored using fewer computer storage resources (e.g., in some embodiments, a pointer can occupy as low as two bytes), as opposed to data manipulation/masking techniques that typically require duplicating existing database tables, and (ii) operations needed to generate limited access pointers are more computationally efficient than operations needed to mask/manipulate data. Indeed, as described in the present document, generating limited access pointers can be performed using array shuffling techniques that can be performed with linear computational complexity. Accordingly, by disclosing techniques that enable providing limited access to database content data using limited access pointers, various embodiments of the present invention improve computational efficiency of database management operations that control access to secure database systems.

FIG. 4 is a flowchart diagram of an example process 400 for enabling access to a database table using a limited access mode. Via the various operations of the process 400, the database management computing device 106 can provide access to anatomized data associated with a database table without using computationally expensive data anatomization techniques that use data masking and/or data manipulation and by using limited access pointers that are generated using randomized associations between database rows of a database table.

The process 400 that is depicted in FIG. 4 begins at operation 401 when the database management computing device 106 identifies a set of non-terminal database values of the database table. As described above, a non-terminal database value may be a database value that is associated with a non-terminal database column of the database table. As described below, in some embodiments: (i) each database value is associated with a respective database row and a respective database column, (ii) each database row comprises a row-wise subset of the group of database values that collectively correspond to a database column schema of the database table, and (iii) the group of database values comprise a plurality of non-terminal database values that are associated with one or more non-terminal database columns and a plurality of terminal database values that are associated with a terminal database column.

In some embodiments, a database row describes a subset of database values for the database table as described by database content data for the database, where the database values all relate to a common database entity (e.g., a common real-world and/or virtual entity). In some embodiments, the subset of database values that are described by a particular database row are referred to herein as the "row-wise database value subset" for the particular database row. For example, if a database row describes that the first name of a corresponding database entity is "John", the last name of the corresponding database entity is "Smith", and the birthdate of the corresponding database entity is Jan. 1, 1980, then the row-wise database value subset for the noted database row may be the set {"John", "Smith", Jan. 1, 1989}.

In some embodiments, a database column describes a subset of database values for the database table as described by the database content for the database, where the database values all relate to a common database field (e.g., a common attribute). For example, if a database table comprises: (i) a first database row that describes that the first name of a corresponding database entity is "John", the last name of the corresponding database entity is "Smith", and the birthdate of the corresponding database entity is Jan. 1, 1980, and (ii) a second row that describes that the first name of a corresponding database entity is "Elizabeth", the last name of the corresponding database entity is "Reed", and the birthdate of the corresponding database entity is Jan. 31, 1990, then the database table may be associated with three database columns: a first database column that is associated with the database value subset {"John", "Elizabeth"} and a first name database field, a second database column that is associated with the database value subset {"Smith", "Reed"} and a last name database field, and a third database column that is associated with the database value subset {Jan. 1, 1980, Jan. 31, 1990} and a birthdate database field. In some embodiments, the set of database fields that correspond to database fields of a database table are referred to herein as the database column schema of the database table. For example, when a database table is associated with a first database column that is associated with the database value subset {"John", "Elizabeth"} and a first name database field, a second database column that is associated with the database value subset {"Smith", "Reed"} and a last name database field, and a third database column that is associated with the database value subset {Jan. 1, 1980, Jan. 31, 1990} and a birthdate database field, then database column schema for the noted database may describe the first name database field, the last name database field, and the birthdate database field.

In some embodiments, the database columns of a database are associated with a database column order, a scheme that describes an ordering of database columns associated with the database table. In some embodiments, the first database column according to the database order is referred to as the initial database column, the last database column according to the database order is referred to as the terminal database column, all of the database columns except the first database column according to the database order are referred to as the non-initial database columns, and all of the database columns except the last database column according to the database order are referred to as the non-terminal database columns. For example, when a database table is associated with a first database column that is associated with the database value subset {"John", "Elizabeth"} and a first name database field, a second database column that is associated with the database value subset {"Smith", "Reed"} and a last name database field, and a third database column that is associated with the database value subset {Jan. 1, 1980, Jan. 31, 1990} and a birthdate database field, if the first database column comes before the second database column and the second database column comes before the third database column according to the database column order, then: (i) the initial database column is the first database column, (ii) the terminal database column is the third database column, (iii) the non-initial database columns are the second database column and the third database column, and (iv) the non-initial database columns are the first database column and the second database column. In some embodiments, a database value that is associated with a non-terminal database column is referred to as a non-terminal database value.

An operational example of a database table 500 is depicted in FIG. 5. As depicted in FIG. 5, the database table 500 is associated with the following {FirstName=Alice}, {LastName=Quack}, {FavoriteRestaurant=ABC}, {FirstName=Bob}, {LastName=Chuckle}, {FavoriteRestaurant=DEF}, {FirstName=Tom}, {LastName=Moo}, and {FavoriteRestaurant=ABC}. As further depicted in FIG. 5, the database table 500 comprises the following database rows: (i) a first database row that is associated with the database values {FirstName=Alice}, {LastName=Quack}, and {FavoriteRestaurant=ABC}, (ii) a second database row that is associated with the database values {FirstName=Bob}, {LastName=Chuckle}, and {FavoriteRestaurant=DEF}, and (iii) a third database row that is associated with the database values {FirstName=Tom}, {LastName=Moo}, and {FavoriteRestaurant=ABC}. As further depicted in FIG. 5, the database table 500 is associated with the following database columns: (i) a first database column that is associated with a FirstName data field and thus with the database values {FirstName=Alice}, {FirstName=Bob}, and {FirstName=Tom}, (ii) a second database column that is associated with a LastName data field and thus with the database values {LastName=Quack}, {LastName=Chuckle}, {LastName=Moo}, and (iii) a third database column that is associated with a FavoriteRestaurant data field and thus with the database values {FavoriteRestaurant=ABC}, {FavoriteRestaurant=DEF}, and {FavoriteRestaurant=ABC}.

In some embodiments, a database table may be associated with a set of full access pointers that are configured to enable full access to the content data associated with the database table. A full access pointer may be a pointer between a non-terminal database value and a subsequent database value for the non-terminal database value, where the subsequent database value for a particular non-terminal database value is a database value from the set of database values of the same database table as the database table of the particular non-terminal database value whose respective database row is the same as the respective database row of the particular non-terminal database value and whose respective database column of the respective column. In some embodiments, in response to a full access request from a requesting computing device, non-shuffled database output data is provided to the requesting computing device, where the non-shuffled database output data describes, for each database row, the row-wise database value subset that is associated with the database row.

In some embodiments, given a non-terminal database value that is associated with a particular database row and a jth database column as defined in accordance with the database column order of a corresponding database table, the subsequent database value for the noted non-terminal database value is a database value of the corresponding database table that is associated with the ith database row and a (j+1)th database column as defined in accordance with the database column order of the corresponding database table. For example, if a database table comprises: (i) a first database row that describes that the first name of a corresponding database entity is "John", the last name of the corresponding database entity is "Smith", and the birthdate of the corresponding database entity is Jan. 1, 1980, and (ii) a second row that describes that the first name of a corresponding database entity is "Elizabeth", the last name of the corresponding database entity is "Reed", and the birthdate of the corresponding database entity is Jan. 31, 1990, then the limited access pointers for the noted database table may include: (i) a full access pointer from "John" to "Smith", "(ii) a full access pointer from "Smith" to Jan. 1, 1980, (iii) a full access pointer from "Elizabeth" to "Reed", and (iv) a full access pointer from "Reed" to Jan. 31, 1980. In some embodiments, each non-terminal database value is associated with at least two limited access pointers: (i) a forward full access pointer from the non-terminal database value to the subsequent database value for the non-terminal database value, and (ii) a backward full access pointer from the subsequent database value for the non-terminal database value to the non-terminal database value. In some embodiments, each non-terminal database value is associated with a unique subsequent database value, such that no two non-terminal database values in the set of non-terminal database values of a database table are assigned the same subsequent database value.

An operational example of full access pointers associated with the database table 500 of FIG. 5 is depicted in FIG. 13. As depicted in FIG. 13, the full access pointers include: a full access pointer 1301 from {FirstName=Alice} to {LastName=Quack}, a full access pointer 1302 from {LastName=Quack} to {FavoriteRestaurant=ABC}, a full access pointer 1303 from {FirstName=Bob} to {LastName=Chuckle}, a full access pointer 1304 from {LastName=Chuckle} to {FavoriteRestaurant=DEF}, a full access pointer 1305 from {FirstName=Tom} to {LastName=Tom}, and a full access pointer 1306 from {LastName=Moo} to {FavoriteRestaurant=ABC}. In some embodiments, using these full access pointers, in a full access mode, the requesting computing device can obtain data about precise data values associated with each of three corresponding individuals. This may be useful, for example, for a machine learning system that is configured to generate a person-specific restaurant preference and/or food preference for a target person. However, this full access mode reveals substantial individual data that may be deemed confidential. In some traditional systems, to accommodate this, a separate "anonymized" database is created, an approach incurs substantial storage costs as well as processing costs associated with anonymizing some data fields described by the underlying database. In contrast, in accordance with various embodiments of the present invention, limited access pointers are used to traverse the database without revealing row-wise associations.

Returning to FIG. 4, at operation 402, the database management computing device 106 identifies a respective subsequent database value for each non-terminal database value. In some embodiments, the respective subsequent database value for a particular non-terminal database value is a database value selected from the same database table as the particular non-terminal database value whose respective database row is different from the respective database row of the non-terminal database value and whose respective database column is different from the respective database column of the non-terminal database value. In some embodiments, the subsequent database value for a particular non-terminal database value is a database value from the set of database values of the same database table as the database table of the particular non-terminal database value whose respective database row is different from the respective database row of the particular non-terminal database value and whose respective database column of the respective column.

In some embodiments, given a non-terminal database value that is associated with a particular database row and a jth database column as defined in accordance with the database column order of a corresponding database table, the subsequent database value for the noted non-terminal database value is a database value of the corresponding database table that is associated with a randomly-selected database row and a (j+1)th database column as defined in accordance with the database column order of the corresponding database table. For example, if a database table comprises: (i) a first database row that describes that the first name of a corresponding database entity is "John", the last name of the corresponding database entity is "Smith", and the birthdate of the corresponding database entity is Jan. 1, 1980, and (ii) a second row that describes that the first name of a corresponding database entity is "Elizabeth", the last name of the corresponding database entity is "Reed", and the birthdate of the corresponding database entity is Jan. 31, 1990, then the limited access pointers for the noted database table may include: (i) a limited access pointer from "John" to "Reed", "(ii) a limited access pointer from "Smith" to Jan. 31, 1990, (iii) a limited access pointer from "Elizabeth" to "Smith", and (iv) a limited access pointer from "Reed" to Jan. 1, 1980.

In some embodiments, generating the subsequent database value for a particular non-terminal database value that is associated with an ith database row of M database rows of the database table and a jth non-terminal database column of N database columns (and hence of N−1 non-terminal database columns) of the database table is performed in accordance with the process 402A that is depicted in FIG. 6. As depicted in FIG. 6, the process 402A begins at operation 601 when N−1 randomly-shuffled database row arrays are generated, each randomly-shuffled database row array being associated with a respective non-terminal database column of the N−1 non-terminal database columns of the database table that comprises a randomly-generated ordering of M database row indicators for the M database rows.

In some embodiments, a shuffled database row array comprises a subset of the database values of the particular database table that are generated in accordance with limited access pointers. For example, if the limited access pointers for a database table include: (i) a limited access pointer from "John" to "Reed", "(ii) a limited access pointer from "Smith" to Jan. 31, 1990, (iii) a limited access pointer from "Elizabeth" to "Smith", and (iv) a limited access pointer from "Reed" to Jan. 1, 1980, then the shuffled database rows of the noted database table may include: (i) a first shuffled database row that is generated based on the first limited access pointer and the fourth limited access pointer and thus comprises the database value subset {"John", "Reed", Jan. 1, 1980}, and (ii) a second shuffled database row that is generated based on the second limited access pointer and the third limited access pointer and thus comprises the database value subset {"Elizabeth", "Smith", Jan. 31, 1990}. Accordingly, as illustrated by this example, in some embodiments, generating a particular shuffled database row comprises: (i) selecting a particular initial database value of the one or more initial database values (e.g., for the first shuffled database row, selecting the initial database value "John"), (ii) recording a plurality of traversed database values that are associated with a recursive traversal of limited access pointers starting from the particular initial database value to a destination terminal database value (e.g., for the first shuffled database row, recording the database value "Reed" that is visited upon traversal of the first limited access pointer originating from "John" and the destination terminal database value Jan. 1, 1980 that is visited upon traversal of the fourth limited access pointer originating from "Reed"), and (iii) generating the particular shuffled database row to comprise the plurality of traversed database values.

In some embodiments, given M database row indicators for M database rows, a randomized shuffling of the M database row indicators is performed using a randomized shuffling technique, such as a randomized shuffling technique that has a linear computational complexity. An example of a randomized shuffling technique that has a linear computational complexity is the Fisher Yates randomized shuffling technique. Accordingly, in some embodiments, generating shuffled database row arrays can be performed with linear computational complexity.

FIG. 7 provides an operational example of N−1=3−1=2 shuffled database row arrays for the database table 500 of FIG. 5. As depicted in FIG. 7, the two shuffled database row arrays include: (i) a first shuffled database row array {3, 1, 2} that is associated with the FirstName database column, and (ii) a second shuffled database row array {2, 3, 1} that is associated with the LastName database column, where each row indicator corresponds to the value assigned to a corresponding accordingly to the database row order described above (i.e., the row order according to which the database row associated with {"Alice", "Quack", "ABC"} is the first database row, the database row associated with {"Bob", "Chuckle", "DEF"} is the second database row, and the database row associated with {"Tom", "Moo", "ABC} is the third database row.

Returning to FIG. 6, at operation 602, the database management computing device 106 identifies an assigned database row indicator that is associated with an ith value of a jth randomly-shuffled database row array (i.e., the randomly-shuffled database row array for the jth non-terminal database column). At operation 603, the database management computing device 106 generates the subsequent database value for the particular non-terminal database value as the database value that is associated with a (j+1)th database column and an assigned database row that corresponds to the assigned database row indicator.

Returning to FIG. 4, at operation 403, the database management computing device 106 generates one or more limited access pointers for each non-terminal database value based on the subsequent database value for the non-terminal database value. In some embodiments, each non-terminal database value is associated with at least two limited access pointers: (i) a forward limited access pointer from the non-terminal database value to the subsequent database value for the non-terminal database value, and (ii) a backward limited access pointer from the subsequent database value for the non-terminal database value to the non-terminal database value.

In some embodiments, a limited access pointer is a pointer between a non-terminal database value and a subsequent database value for the non-terminal database value, where the subsequent database value for a particular non-terminal database value is a database value from the set of database values of the same database table as the database table of the particular non-terminal database value whose respective database row is different from the respective database row of the particular non-terminal database value and whose respective database column of the respective column. In some embodiments, given a non-terminal database value that is associated with a particular database row and a jth database column as defined in accordance with the database column order of a corresponding database table, the subsequent database value for the noted non-terminal database value is a database value of the corresponding database table that is associated with a randomly-selected database row and a (j+1)th database column as defined in accordance with the database column order of the corresponding database table. For example, if a database table comprises: (i) a first database row that describes that the first name of a corresponding database entity is "John", the last name of the corresponding database entity is "Smith", and the birthdate of the corresponding database entity is Jan. 1, 1980, and (ii) a second row that describes that the first name of a corresponding database entity is "Elizabeth", the last name of the corresponding database entity is "Reed", and the birthdate of the corresponding database entity is Jan. 31, 1990, then the limited access pointers for the noted database table may include: (i) a limited access pointer from "John" to "Reed", "(ii) a limited access pointer from "Smith" to Jan. 31, 1990, (iii) a limited access pointer from "Elizabeth" to "Smith", and (iv) a limited access pointer from "Reed" to Jan. 1, 1980.

In some embodiments, a limited access pointer is a pointer from a first key-value pair to a second key-value pair that is randomly selected. In some embodiments, each limited access pointer of a database is associated with a reverse pointer in the backward direction. An operational example of a logical diagram of a database table with full access pointers and limited access pointers is depicted in FIG. 8. As depicted in FIG. 8, each database field corresponding to a key-value pair is associated with a full access pointer represented by a solid arrow and a limited access pointer represented by a dashed arrow. In some embodiments, given a database having N ordered database columns and M database rows, N–1 arrays may be generated, with each array being associated with a respective non-final database column in accordance with the database column order and including M values each corresponding to an identifier of a database row. For example, given three database rows associated with the row identifiers A, B, C, and further given and two ordered database columns corresponding to a first name attribute and a last name attribute, then one arrays initialized to {A, B, C} may first be generated, where the array may be associated with the first name attribute. Then, each initialized array is randomly shuffled, for example by using the Fisher Yates algorithm. Suppose that the random shuffling generates the following array for the for the first name attribute {C, A, B}. This shuffled array then may then be used to generate the following limited access pointers: a limited access pointer from the first name field of A to the last name field of C; a limited access pointer from the first name field of B to the last name field of A; and a limited access pointer from the first name field of C to the last name field of B.

FIG. 9 provides an operational example of limited access pointers associated with the database table 500 of FIG. 9. As depicted in FIG. 9, the limited access pointers associated with the database table 500 include: (i) a forward limited access 901 pointer from {FirstName=Alice} to {LastName=Moo}, and a corresponding backward limited access pointer 911 from {LastName=Moo} to {FirstName=Alice}, (ii) a forward limited access pointer 902 from {LastName=Quack} to {FavoriteRestaurant=DEF}, and a corresponding backward limited access pointer 912 from {FavoriteRestaurant=DEF} to {LastName=Quack}, (iii) a forward limited access pointer 903 from {FirstName=Bob} to {LastName=Quack}, and a corresponding backward limited access pointer 913 from {LastName=Quack} to {FirstName=Bob}, (iv) a forward limited access pointer 904 from {LastName=Chuckle} to {FavoriteRestaurant=ABC}, and a corresponding backward limited access pointer 914 from {FavoriteRestaurant=ABC} to {LastName=Chuckle}, (v) a forward limited access pointer 905 from {FirstName=Tom} to {LastName=Chuckle}, and a corresponding backward limited access pointer 915 from {LastName=Chuckle} to {FirstName=Tom}, and (vi) a limited access pointer 906 from {LastName=Moo} to {FavoriteRestaurant=ABC}, and a corresponding backward limited access pointer 916 from {FavoriteRestaurant=ABC} to {LastName=Moo}. The limited access pointers that are depicted in FIG. 9 are generated based on subsequent database value associations that are in turn determined based on the shuffled database row arrays of FIG. 7.

Returning to FIG. 4, at operation 404, in response to a limited access request from a requesting computing device, the database management computing device 106 provides shuffled database output data to the requesting computing device. In some embodiments, shuffled database output data comprises a plurality of shuffled database rows each comprising a shuffled row-wise subset of the group of database values that collectively correspond to the database column schema, and the plurality of shuffled database rows are determined based on each limited access pointer. In some embodiments, generating a particular shuffled database row comprises: identifying one or more initial database values that are associated with an initial database column; selecting a particular initial database value of the one or more initial database values; recording a plurality of traversed database values that are associated with a recursive traversal of limited access pointers starting from the particular initial database value to a destination terminal database value; and generating the particular shuffled database row to comprise the plurality of traversed database values.

In some embodiments, a shuffled database row comprises a subset of the database values of the particular database table that are generated in accordance with limited access pointers. For example, if the limited access pointers for a database table include: (i) a limited access pointer from "John" to "Reed", (ii) a limited access pointer from "Smith" to Jan. 31, 1990, (iii) a limited access pointer from "Elizabeth" to "Smith", and (iv) a limited access pointer from "Reed" to Jan. 1, 1980, then the shuffled database rows of the noted database table may include: (i) a first shuffled database row that is generated based on the first limited access pointer and the fourth limited access pointer and thus comprises the database value subset {"John", "Reed", Jan. 1, 1980}, and (ii) a second shuffled database row that is generated based on the second limited access pointer and the third limited access pointer and thus comprises the database value subset {"Elizabeth", "Smith", Jan. 31, 1990}. Accordingly, as illustrated by this example, in some embodiments, generating a particular shuffled database row comprises: (i) selecting a particular initial database value of the one or more initial database values (e.g., for the first shuffled database row, selecting the initial database value "John"), (ii) recording a plurality of traversed database values that are associated with a recursive traversal of limited access pointers starting from the particular initial database value to a destination terminal database value (e.g., for the first shuffled database row, recording the database value "Reed" that is visited upon traversal of the first limited access pointer originating from "John" and the destination terminal database value Jan. 1, 1980 that is visited upon traversal of the fourth limited access pointer originating from "Reed"), and (iii) generating the particular shuffled database row to comprise the plurality of traversed database values.

For example, in some embodiments, in accordance with the limited access mode pointers of FIG. 9, the anonymized database table 1000 of FIG. 10 is provided as output data to the requesting computing device of a limited access request for the database table 500 of FIG. 5. As depicted in FIG. 10, the anonymized database table 1000 includes a first shuffled database row that is associated with the shuffled row-wise database value subset {FirstName=Alice}, {LastName=Moo}, {{FavoriteRestaurant=ABC}}, a second shuffled database row that is associated with the shuffled row-wise database value subset {{FirstName=Bob}, {LastName=Quack}, {{FavoriteRestaurant=DEF}}, and a third shuffled database row that is associated with the shuffled row-wise database value subset{{FirstName=Tom}, {LastName=Chuckle}, {{FavoriteRestaurant=ABC}}. In some embodiments, while this query output does not accurately reflect row-wise associations between key-value pairs, it nevertheless shows the distribution of key-value pairs across the database rows. For example, this query output shows that ABC is a more popular restaurant than DEF.

Accordingly, various embodiments of the present invention relate to enabling two modes of access to an encrypted database: a full database access mode and a limited database access mode. The full database access mode is enabled using full access pointers between a sequence of key/value pairs that belong to a common database row, while the limited database access mode is created using limited access pointers between a sequence of key/value pairs that belong to different database rows. In some embodiments, a user having full access privileges can access decrypted data associated with the database using the full access pointers and thus obtain precise data describing row-wise associations of key-value pairs associated with the database, while a user having limited access privileges can access decrypted data associated with the database using limited access pointers and thus obtain data describing distribution of key-value pairs across the rows of the database without obtaining data describing row-wise associations of key-value pairs associated with the database.

In some embodiments, the limited access pointers of a database table may be modified as a result of database row insertion and/or database row deletion. In some embodiments, the process 400 may be performed during each database row insertion to reset the limited access pointers of the database. In some embodiments, given M database rows, removal of a database rows causes M−1 database fields to remain without limited access pointer associations. In some of the noted embodiments, limited access pointers across the M−1 database fields can be established via a matchmaking process to re-establish the database to a state with complete limited access pointers.

FIG. 11 is a flowchart diagram of an example process 1100 for updating limited access pointers of a database table in response to a row insertion request to insert a new database row to the plurality of database rows of the database table. As depicted in FIG. 11, at operation 1101, the database management computing device 106 updates the group of database values associated with the database table to integrate new database values associated with the new database row. At operation 1102, the database management computing device 106 removes each existing limited access pointer. At operation 1103, the database management computing device 106 generates replacement limited access pointers for the updated group of database values as updated by integrating the new database values.

In some embodiments, in response to a row insertion request to insert a new database row to M existing database rows of the database table that comprises N database columns, the following operations are performed, where j iterates over N−1 database columns (i.e., every database column except the terminal database column) of the noted database table in accordance with the database column order: for each jth database value of the new database row: (i) one or more first new limited access pointers (e.g., a forward limited access pointer and a backward limited access pointer) are generated between the jth database value and a respective subsequent data value that is a randomly-selected database value which belongs to the (j+1)th database column of the N database columns and a randomly-selected database row of the M existing database rows, (ii) one or more second new limited access pointers (e.g., a forward limited access pointer and a backward limited access pointer) are generated between the randomly-selected database value and a respective subsequent data value that is the (j+2)th database value of the new database row, and (iii) the existing limited access pointers associated with the randomly-selected database value (e.g., the limited access pointer(s) between the randomly-selected database value and an existing database value belonging to one of the M existing database rows as the subsequent database value) is deleted. In this way, using operations that have a linear computational complexity, a new database row can be added to the M existing database rows while ensuring that each non-terminal database value is associated with one or more limited access pointers with no more than and no less than one respective subsequent database value.

FIG. 12 is a flowchart diagram of an example process 1200 for updating limited access pointers of a database table in response to a row deletion request to delete a deleted database row from the database rows of a database table. As depicted in FIG. 12, at operation 1201, the database management computing device 106 updates the group of database values of the database table to exclude deleted database values associated with the deleted database row. At operation 1201, the database management computing device 106 deletes the limited access pointers that are associated with the deleted database values (i.e., limited access pointers for which a deleted database value is either the corresponding non-terminal database value, or a subsequent database value, or both). At operation 1203, the database management computing device 106 identifies each affected non-deleted database value that was previously associated with a deleted limited access pointer (i.e., each database value that was not part of the deleted database row but either had a limited access pointer to a database value of the deleted database row or had a limited access pointer from a database value of the deleted database row). At operation 1204, the database management computing device 106 generates a replacement limited access pointer for each affected non-deleted non-terminal database value from the deleted non-terminal database value to a subsequent deleted database value that is randomly selected from other affected non-deleted database value. In other words, the database management computing device 106 generates replacement limited access pointers between those database values that were affected by deletion of limited access pointers associated with the deleted database row but were not part of the deleted database row themselves.

Accordingly, as described above, various embodiments of the present invention improve computational efficiency of database management operations that control access to secure database systems by introducing techniques that enable providing limited access to database content data using limited access pointers. The limited access mode enabled by various embodiments of the present invention can be established by using limited access pointers that point across database values without revealing row-wise associations of those database values. These limited access pointers are more efficient than data anonymization techniques that use manipulation and/or masking of underlying database value data in at least two ways: (i) pointers can be stored using fewer computer storage resources (e.g., in some embodiments, a pointer can occupy as low as two bytes), as opposed to data manipulation/masking techniques that typically require duplicating existing database tables, and (ii) operations needed to generate limited access pointers are more computationally efficient than operations needed to mask/manipulate data. Indeed, as described in the present document, generating limited access pointers can be performed using array shuffling techniques that can be performed with linear computational complexity. Accordingly, by disclosing techniques that enable providing limited access to database content data using limited access pointers, various embodiments of the present invention improve computational efficiency of database management operations that control access to secure database systems.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates a limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, to correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as a description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although, specific terms are employed herein, they are used in a generic and descriptive sense only and not for purposes of limitation.

The invention claimed is:

1. An apparatus for enabling limited access to a database table that is associated with a plurality of database rows and a plurality of database columns, the apparatus comprising at least one processor and at least one memory including program code, the at least one memory and the program code configured to, with the processor, cause the apparatus to at least:

identify a group of database values, wherein: (i) each database value is associated with a respective database row and a respective database column, (ii) each database row comprises a row-wise subset of the group of database values that collectively correspond to a database column schema of the database table, and (iii) the group of database values comprise a plurality of non-terminal database values that are associated with one or more non-terminal database columns and a plurality of terminal database values that are associated with a terminal database column;

for each non-terminal database value, generate a limited access pointer to a respective subsequent database value whose respective database row is different from the respective database row of the non-terminal database value and whose respective database column is different from the respective database column of the non-terminal database value; and in response to a limited access request from a requesting computing device, provide shuffled database output data to the requesting computing device, wherein: (i) the shuffled database output data comprises a plurality of shuffled database rows each comprising a shuffled row-wise subset of the group of database values that collectively correspond to the database column schema, and (ii) the plurality of shuffled database rows are determined based on each limited access pointer.

2. The apparatus of claim 1, wherein generating a particular shuffled database row comprises:

identifying one or more initial database values that are associated with an initial database column;

selecting a particular initial database value of the one or more initial database values;

recording a plurality of traversed database values that are associated with a recursive traversal of limited access pointers starting from the particular initial database value to a destination terminal database value; and generating the particular shuffled database row to comprise the plurality of traversed database values.

3. The apparatus of claim 1, wherein generating each limited access pointer comprises:

given N database columns and M database rows, generating N−1 randomly-shuffled database row arrays each comprising M database row indicators corresponding to the M database rows, wherein each randomly-shuffled database row array is associated with a corresponding non-terminal database column; and for each particular non-terminal database value that is associated with an ith database row and a jth database column:

identifying an assigned database row indicator that is associated with an ith value of a jth randomly-shuffled database row array, identifying the subsequent database value for the particular non-terminal database value as the database value that is associated with a (j+1)th database column and an assigned database row that corresponds to the assigned database row indicator, and generating the limited access pointer for the particular non-terminal database value as a pointer from the particular non-terminal database value to the subsequent database value.

4. The apparatus of claim 1, wherein the at least one memory and the program code are further configured to, with the processor, cause the apparatus to at least:

receive a row insertion request to insert a new database row to the plurality of database rows; and for each non-terminal database value of the new database row that is associated with a jth database column:

identify a randomly-selected database value that is associated with a randomly-selected database row of the plurality of database rows and a (j+1)th database column of the plurality of database columns, remove the limited access pointer between the randomly-selected database value and the respective subsequent database value for the randomly-selected database value, generate a first new limited access pointer between the non-terminal database value and the randomly-selected database value as the respective subsequent value for the non-terminal database value, and generate a second new limited access pointer between the randomly-selected database value and a (j+2)th database value of the new database row as the respective subsequent database value for the randomly-selected database value.

5. The apparatus of claim 1, wherein the at least one memory and the program code are further configured to, with the processor, cause the apparatus to at least:

receive a row deletion request to delete a deleted database row from the plurality of database rows;

update the group of database values to exclude deleted database values associated with the deleted database row;

delete each limited access pointer associated with the deleted database values;

identify each affected non-deleted database value that was previously associated with a deleted limited access pointer; and for each affected non-deleted non-terminal database value, generate a replacement limited access pointer from the deleted non-terminal database value to a subsequent deleted database value that is randomly selected from other affected non-deleted database value.

6. The apparatus of claim 1, wherein each non-terminal database value is associated with a forward limited access pointer from the non-terminal database value to the respective subsequent database value for the non-terminal database value and a backward limited access pointer from the respective subsequent database value for the non-terminal database value to the non-terminal database value.

7. The apparatus of claim 1, wherein the at least one memory and the program code are further configured to, with the processor, cause the apparatus to at least:

in response to a full access request from the requesting computing device, provide non-shuffled database output data to the requesting computing device, wherein the non-shuffled database output data describes, for each database row, the row-wise database value subset that is associated with the database row.

8. A computer-implemented method for enabling limited access to a database table that is associated with a plurality of database rows and a plurality of database columns, the apparatus comprising at least one processor and at least one memory including program code, the at least one memory and the program code configured to, with the processor, cause the apparatus to at least:

identifying a group of database values, wherein: (i) each database value is associated with a respective database row and a respective database column, (ii) each database row comprises a row-wise subset of the group of database values that collectively correspond to a database column schema of the database table, and (iii) the group of database values comprise a plurality of non-terminal database values that are associated with one or more non-terminal database columns and a plurality of terminal database values that are associated with a terminal database column;

for each non-terminal database value, generating a limited access pointer to a respective subsequent database value whose respective database row is different from the respective database row of the non-terminal database value and whose respective database column is different from the respective database column of the non-terminal database value; and in response to a limited access request from a requesting computing device, providing shuffled database output data to the requesting computing device, wherein: (i) the shuffled database output data comprises a plurality of shuffled database rows each comprising a shuffled row-wise subset of the group of database values that collectively correspond to the database column schema, and (ii) the plurality of shuffled database rows are determined based on each limited access pointer.

9. The computer-implemented method of claim 8, wherein generating a particular shuffled database row comprises:

identifying one or more initial database values that are associated with an initial database column;

selecting a particular initial database value of the one or more initial database values;

recording a plurality of traversed database values that are associated with a recursive traversal of limited access pointers starting from the particular initial database value to a destination terminal database value; and generating the particular shuffled database row to comprise the plurality of traversed database values.

10. The computer-implemented method of claim 8, wherein generating each limited access pointer comprises:

given N database columns and M database rows, generating N−1 randomly-shuffled database row arrays each comprising M database row indicators corresponding to the M database rows, wherein each randomly-shuffled database row array is associated with a corresponding non-terminal database column; and for each particular non-terminal database value that is associated with an ith database row and a jth database column:

identifying an assigned database row indicator that is associated with an ith value of a jth randomly-shuffled database row array, identifying the subsequent database value for the particular non-terminal database value as the database value that is associated with a (j+1)th database column and an assigned database row that corresponds to the assigned database row indicator, and generating the limited access pointer for the particular non-terminal database value as a pointer from the particular non-terminal database value to the subsequent database value.

11. The computer-implemented method of claim 8, further comprising:

receiving a row insertion request to insert a new database row to the plurality of database rows; and for each non-terminal database value of the new database row that is associated with a jth database column:

identifying a randomly-selected database value that is associated with a randomly-selected database row of the plurality of database rows and a (j+1)th database column of the plurality of database columns, removing the limited access pointer between the randomly-selected database value and the respective subsequent database value for the randomly-selected database value, generating a first new limited access pointer between the non-terminal database value and the randomly-selected database value as the respective subsequent value for the non-terminal database value, and generating a second new limited access pointer between the randomly-selected database value and a (j+2)th database value of the new database row as the respective subsequent database value for the randomly-selected database value.

12. The computer-implemented method of claim 8, further comprising:

receiving a row deletion request to delete a deleted database row from the plurality of database rows;

updating the group of database values to exclude deleted database values associated with the deleted database row;

removing each limited access pointer associated with the deleted database values;

identifying each affected non-deleted database value that was previously associated with a deleted limited access pointer; and for each affected non-deleted non-terminal database value, generating a replacement limited access pointer from the deleted non-terminal database value to a subsequent deleted database value that is randomly selected from other affected non-deleted database value.

13. The computer-implemented method of claim 8, wherein each non-terminal database value is associated with a forward limited access pointer from the non-terminal database value to the respective subsequent database value for the non-terminal database value and a backward limited access pointer from the respective subsequent database value for the non-terminal database value to the non-terminal database value.

14. The computer-implemented method of claim 8, wherein the at least one memory and the program code are further configured to, with the processor, cause the apparatus to at least:

in response to a full access request from the requesting computing device, provide non-shuffled database output data to the requesting computing device, wherein the non-shuffled database output data describes, for each database row, the row-wise database value subset that is associated with the database row.

15. A computer program product for enabling limited access to a database table that is associated with a plurality of database rows and a plurality of database columns, the computer program product comprising at least one non-transitory computer-readable storage medium having computer-readable program code portions stored therein, the computer-readable program code portions configured to:

identify a group of database values, wherein: (i) each database value is associated with a respective database row and a respective database column, (ii) each database row comprises a row-wise subset of the group of database values that collectively correspond to a database column schema of the database table, and (iii) the group of database values comprise a plurality of non-terminal database values that are associated with one or more non-terminal database columns and a plurality of terminal database values that are associated with a terminal database column;

for each non-terminal database value, generate a limited access pointer to a respective subsequent database value whose respective database row is different from the respective database row of the non-terminal database value and whose respective database column is different from the respective database column of the non-terminal database value; and in response to a limited access request from a requesting computing device, provide shuffled database output data to the requesting computing device, wherein: (i) the shuffled database output data comprises a plurality of shuffled database rows each comprising a shuffled row-wise subset of the group of database values that collectively correspond to the database column schema, and (ii) the plurality of shuffled database rows are determined based on each limited access pointer.

16. The computer program product of claim 15, wherein generating a particular shuffled database row comprises:
identifying one or more initial database values that are associated with an initial database column;
selecting a particular initial database value of the one or more initial database values;
recording a plurality of traversed database values that are associated with a recursive traversal of limited access pointers starting from the particular initial database value to a destination terminal database value; and
generating the particular shuffled database row to comprise the plurality of traversed database values.

17. The computer program product of claim 15, wherein generating each limited access pointer comprises:
given N database columns and M database rows, generating N−1 randomly-shuffled database row arrays each comprising M database row indicators corresponding to the M database rows, wherein each randomly-shuffled database row array is associated with a corresponding non-terminal database column; and
for each particular non-terminal database value that is associated with an ith database row and a jth database column:
identifying an assigned database row indicator that is associated with an ith value of a jth randomly-shuffled database row array,
identifying the subsequent database value for the particular non-terminal database value as the database value that is associated with a (j+1)th database column and an assigned database row that corresponds to the assigned database row indicator, and
generating the limited access pointer for the particular non-terminal database value as a pointer from the particular non-terminal database value to the subsequent database value.

18. The computer program product of claim 15, wherein the computer-readable program code portions are further configured to:
receive a row insertion request to insert a new database row to the plurality of database rows; and
for each non-terminal database value of the new database row that is associated with a jth database column:
identify a randomly-selected database value that is associated with a randomly-selected database row of the plurality of database rows and a (j+1)th database column of the plurality of database columns,
remove the limited access pointer between the randomly-selected database value and the respective subsequent database value for the randomly-selected database value,
generate a first new limited access pointer between the non-terminal database value and the randomly-selected database value as the respective subsequent value for the non-terminal database value, and
generate a second new limited access pointer between the randomly-selected database value and a (j+2)th database value of the new database row as the respective subsequent database value for the randomly-selected database value.

19. The computer program product of claim 15, wherein the computer-readable program code portions are further configured to:
receive a row deletion request to delete a deleted database row from the plurality of database rows;
update the group of database values to exclude deleted database values associated with the deleted database row;
delete each limited access pointer associated with the deleted database values;
identify each affected non-deleted database value that was previously associated with a deleted limited access pointer; and
for each affected non-deleted non-terminal database value, generate a replacement limited access pointer from the deleted non-terminal database value to a subsequent deleted database value that is randomly selected from other affected non-deleted database value.

20. The computer program product of claim 15, wherein each non-terminal database value is associated with a forward limited access pointer from the non-terminal database value to the respective subsequent database value for the non-terminal database value and a backward limited access pointer from the respective subsequent database value for the non-terminal database value to the non-terminal database value.

* * * * *